(12) United States Patent
Tran et al.

(10) Patent No.: US 11,159,944 B2
(45) Date of Patent: Oct. 26, 2021

(54) WIRELESS-NETWORK ATTACK DETECTION

(71) Applicant: T-Mobile USA, Inc., Bellevue, WA (US)

(72) Inventors: Antoine T. Tran, Bellevue, WA (US); Emile Minh Tran, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 108 days.

(21) Appl. No.: 16/375,462

(22) Filed: Apr. 4, 2019

(65) Prior Publication Data
US 2020/0275277 A1    Aug. 27, 2020

Related U.S. Application Data

(60) Provisional application No. 62/808,576, filed on Feb. 21, 2019.

(51) Int. Cl.
*H04W 12/121* (2021.01)
*H04L 29/06* (2006.01)
(Continued)

(52) U.S. Cl.
CPC ......... *H04W 12/121* (2021.01); *H04L 9/3242* (2013.01); *H04L 9/3271* (2013.01);
(Continued)

(58) Field of Classification Search
CPC ............. H04W 12/1201; H04W 60/00; H04W 12/04031; H04W 12/00512;
(Continued)

(56) References Cited

U.S. PATENT DOCUMENTS 10,129,283 B1 * 11/2018 Briggs ................ H04L 63/1425
2007/0226796 A1 * 9/2007 Gilbert ................ H04L 63/1425
                                                                 726/22
(Continued)

FOREIGN PATENT DOCUMENTS

KR        2011018539        10/2011

OTHER PUBLICATIONS

Dabrowski et al, "The Messenger Shoots Back: Network Operator Based IMSI Catcher Detection", Intl Symposium on Research in Attacks, Intrusions and Defenses, Project Mobile Phone Radio Network Security, SpringerLink, Sep. 2016, 23 pages.
(Continued)

*Primary Examiner* — Cheng-Feng Huang
(74) *Attorney, Agent, or Firm* — Lee & Hayes, P.C.

(57) ABSTRACT

In some examples, a terminal can establish wireless communication with a base station. The terminal can determine a challenge, transmit the challenge, receive a response, and determine that the response is valid. The terminal can, in response, establish a secure network tunnel to a network node. In some examples, a terminal can determine a first communication parameter associated with communication with the base station. The terminal can receive data indicating a second communication parameter via a secure network tunnel. The terminal can determine that the communication parameters do not match, and, in response, provide an indication that an attack is under way against the network terminal. Some example terminals transmit a challenge, determine a response status associated with the challenge, and determine that an attack is under way based on the response status.

20 Claims, 12 Drawing Sheets

(51) Int. Cl.
*H04L 9/32* (2006.01)
*H04W 60/00* (2009.01)
*H04W 12/0431* (2021.01)

(52) U.S. Cl.
CPC ............ *H04L 63/029* (2013.01); *H04L 63/08* (2013.01); *H04W 12/0431* (2021.01); *H04W 60/00* (2013.01)

(58) Field of Classification Search
CPC ....... H04W 12/0609; H04W 12/00514; H04W 12/001; H04W 12/121; H04W 12/0431; H04W 12/069; H04W 8/20; H04W 8/26; H04W 60/04; H04W 12/71; H04W 12/72; H04W 12/03; H04L 63/029; H04L 9/3271; H04L 9/3242; H04L 9/0894; H04L 2209/80; H04L 2463/146; H04L 63/08
See application file for complete search history.

(56) References Cited

U.S. PATENT DOCUMENTS

| | | | |
|---|---|---|---|
| 2008/0043686 | A1 | 2/2008 | Sperti et al. |
| 2011/0202755 | A1* | 8/2011 | Orsini .................. G06F 21/602 713/151 |
| 2013/0067560 | A1* | 3/2013 | Zuk ...................... H04L 63/12 726/13 |
| 2016/0014159 | A1* | 1/2016 | Schrecker ............ H04L 63/105 726/1 |
| 2017/0006034 | A1* | 1/2017 | Link, II .............. H04L 61/2514 |
| 2017/0318463 | A1* | 11/2017 | Lee ..................... H04W 48/02 |
| 2018/0047249 | A1* | 2/2018 | Nelson ................ G07F 17/3211 |
| 2019/0044950 | A1* | 2/2019 | Chen .................... H04L 63/107 |
| 2019/0149545 | A1* | 5/2019 | Arora ..................... H04L 9/006 726/7 |
| 2019/0149562 | A1* | 5/2019 | Maeda ................... H04L 12/28 726/23 |

OTHER PUBLICATIONS

The PCT Search Report and Written Opinion dated Sep. 18, 2020 for PCT Application No. PCT/US2020/016338, 12 pages.
Rupprecht et al, "On Security Research Towards Future Mobile Network Generations", arXiv:1710.08932v2, Mar. 6, 2018, 25 pages.
Thales, "Discussion on key-free secured pairing and protected radio access to network", S3-161640, 3GPP TSG SA WG3 Meeting #85, Santa Cruz de Tenerife, Spain, Oct. 28, 2016, 8 pages.
"E2E VoLTE Call Setup (1/4): Initial Attach and Default EPS Bearercreation", Red Mouse, Jul. 28, 2015, 21 pages.
ETSI TS 133 401 V13.2.0, Apr. 2016, "Digital Cellular Telecommunications System (Phase 2+) (GSM); Universal Mobile Telecommunications System (UMTS); LTE", pp. 1, 21-25, 33-35, 40-43, and 64-68.
Helix, E., "Long Term Evolution (LTE) Attach and Default Bearer Setup", Dec. 11, 2012, 6 pages.
"Multilateration", Wikipedia, Jan. 2019, retrieved Jan. 31, 2019 from <<https://en.wikipedia.org/w/index.php?title=Multilateration&oldid=880453784>>, 12 pages.
"Power Control" ShareTechnote, retrieved Jan. 29, 2019 from <<https://web.archive.org/web/20180413163315/www.sharetechnote.com/html/PowerControl_LTE_html>>, Apr. 13, 2018, 9 pages.
"Stingray Phone Tracker", Wikipedia, Dec. 2018, retrieved Jan. 31, 2019 from <<https://en.wikipedia.org/w/index.php?title=Stingray_phone_tracker&oldid=872283658>>, 12 pages.
"Timing Advance", ShareTechnote, retrieved Jan. 28, 2019 from <<https://web.archive.org/web/20161215073630/http://www.sharetechnote.com/html/Handbook_LTE_TimingAdvance.html>>, Dec. 15, 2016, 2 pages.
"Transport Layer Security", Wikipedia, Jan. 2019, retrieved Jan. 29, 2019 from <<https://en.wikipedia.org/w/index.php?title=Transport_Layer_Security&oldid=877971366>>, pp. 1, 2, 23-25.

* cited by examiner

WIRELESS-NETWORK ATTACK DETECTION

CROSS-REFERENCE TO RELATED APPLICATIONS

This application is a nonprovisional application of, and claims priority to and the benefit of, U.S. Application Ser. No. 62/808,576, filed Feb. 21, 2019, and entitled "Wireless-Network Attack Detection", the entirety of which is incorporated herein by reference.

BACKGROUND

Telecommunications terminals (sometimes referred to as user equipment, or UE), such as cellular telephones, may connect to a variety of wireless telecommunications networks that are operated by different companies. These telecommunications networks may be cellular networks that operate according to a variety of protocols, such as a Long-Term Evolution (LTE), a Voice over LTE (VoLTE), an LTE-in-unlicensed-spectrum (LTE-u), or a fifth generation (5G) mobile network protocol. In the course of a terminal registering to, and communicating via, a telecommunications network, information that identifies a user of the terminal may be conveyed between the terminal and the telecommunications network.

BRIEF DESCRIPTION OF THE DRAWINGS

The Detailed Description is set forth with reference to the accompanying figures. Identical reference numerals have been used, where possible, to designate features shown on multiple figures. The attached drawings are for purposes of illustration and are not necessarily to scale. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
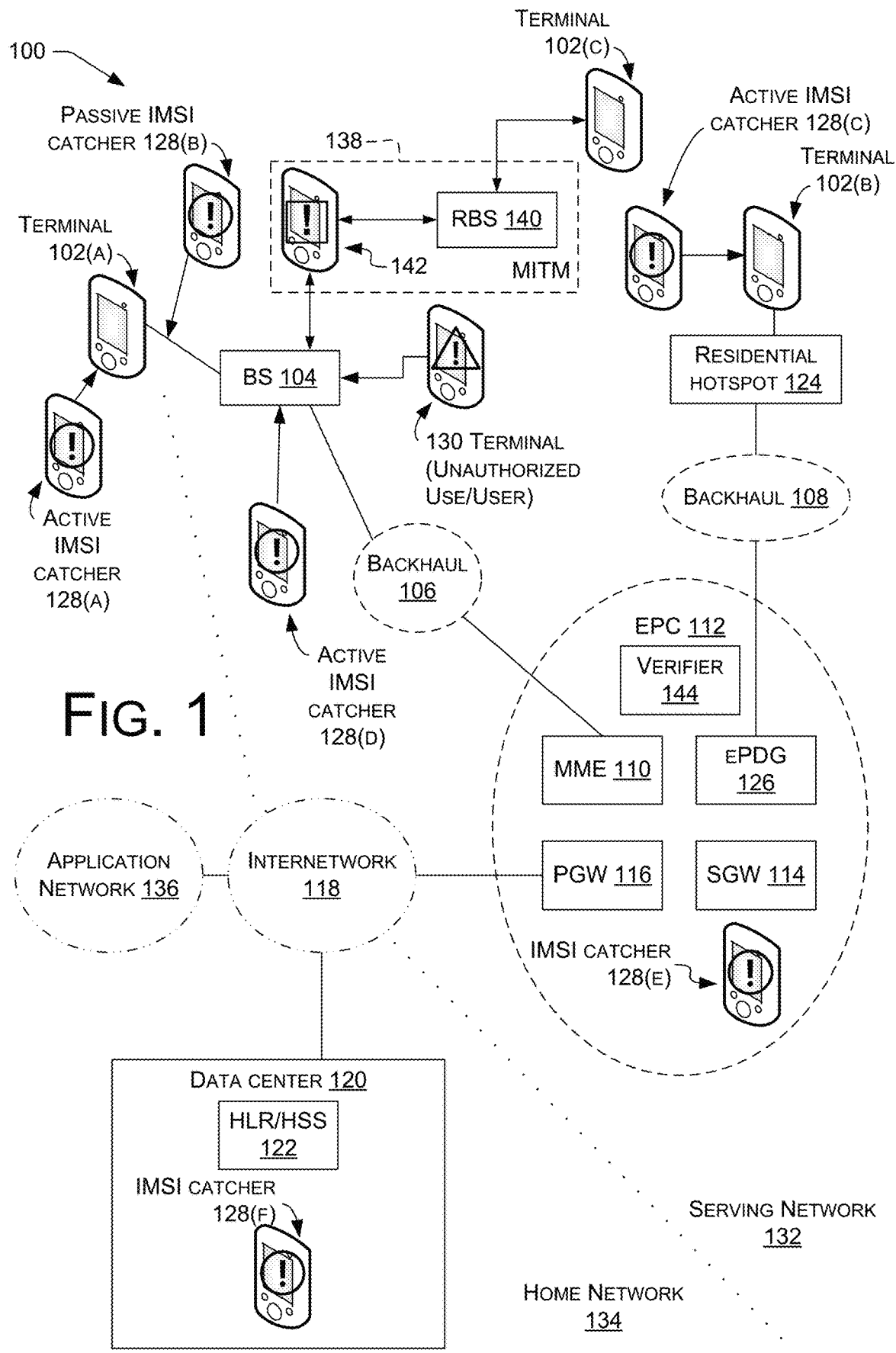
FIG. 1 illustrates an example network architecture for a telecommunications network that can provide for improved mobile subscriber privacy and network security.

In the process of a terminal registering to, and communicating via a telecommunications network, the terminal may provide personally identifiable information (PII) to the telecommunications network, which is used to identify the terminal. As used herein, a terminal may be a feature phone, a smartphone, a tablet computer, a phablet, an embedded computer system, an Internet of Things (IoT) device, or any other computing device that is capable of using wireless communication services that are provided by communication networks (of one type or various types). Example telecommunications networks may include second-generation (2G) cellular networks such as GSM or IS-95, third-generation (3G) cellular networks such as UMTS or CDMA2000 (1×RTT or 1×EV-DO), fourth-generation (4G) cellular networks such as LTE or LTE-Advanced, or 5G cellular networks such as Third-Generation Partnership Project (3GPP) New Radio (NR).

This PII may comprise an International Mobile Subscriber Identity (IMSI), an International Mobile Equipment Identity (IMEI), or a Mobile Subscriber International Subscriber Directory Number (MSISDN). The IMSI may comprise a 14- or 15-digit number, which is stored on a Subscriber Identity Module (SIM) card or Universal SIM (USIM) card that is inserted into the terminal and stored in the Home Operator Database. Example Home Operator Databases can include, e.g., a Home Location Register (HLR), Home Subscriber Server (HSS), 5G Unified Data Management (UDM) network function, or 5G Unified Data Repository (UDR). If an adversary obtains access to view communications across the telecommunications network, then the adversary may identify a particular user based on the IMSI or other PII associated with his or her terminal. Since terminals are connected to specific physical points on the telecommunications network (e.g., a cell tower or a residential hotspot), the adversary may use this IMSI to determine, and track, where a user is physically located.

Moreover, a terminal may transmit multiple forms of PII, such as both an IMSI and an IMEI. Therefore, a malicious actor ("adversary") can steal a terminal and register for communication services using the IMSI of the adversary together with the IMEI of the stolen terminal. This can also permit adversaries to track users by IMEI even if they use temporary identities, such as a Temporary Mobile Subscriber Identity (TMSI), instead of an IMSI.

In various examples, a network terminal, e.g., of a 2G-5G network, can connect to a home network via a base station (BS) associated with a serving network, e.g., the home network (if not roaming) or a visited network (if roaming). The terminal can have a terminal identifier (TID), such as an IMEI or other Permanent Equipment Identifier (PEI), and a network subscriber can have a subscriber identifier (SID), such as an IMSI or other Subscriber Permanent Identifier (SUPI).

Adversaries may also operate BSes, referred to as "rogue base stations" (RBSes). An RBS may carry out man-in-the-middle (MITM) or denial-of-service (DoS) attacks against terminals by broadcasting higher power than a legitimate BS, thereby inducing terminals to connect to the RBS. This can also provide the RBS with data usable by an adversary to determine a terminal's location. As used herein, accordingly, the term "attack" includes attacks in which the adversary attempts to subvert a terminal itself, e.g., by installing malware, and also attacks in which an adversary does not attempt to subvert the terminal, e.g., IMSI-catching or traffic-sniffing attacks.

A solution to the problem of adversaries being able to track users is to prevent adversaries from obtaining and monitoring IMSIs. One solution is to encrypt the IMSI. For example, using public key cryptography, when the IMSI is transmitted, it may be encrypted with the public key of the destination device, e.g., the public key of the serving network or home network. Then, that destination, e.g., the serving network or home network, may decrypt the IMSI using its private key.

However, this encryption approach is not supported by some earlier network technologies, such as 2G. These earlier technologies are popular, e.g., for IoT devices, since they have reduced computational and storage burden compared to more recent technologies, such as 5G. Moreover, an adversary may operate an RBS as a component of a MITM attack and transparently proxy traffic between a user's terminal and a legitimate serving network. This can permit adversaries to geolocate users even if some traffic is encrypted. Furthermore, some earlier network schemes may be vulnerable to bulk decryption of message traffic by adversaries operating RBSes as MITMs.

Various examples provide at least one of: increased privacy of PII; secure communication between terminals and networks, even on earlier network technologies; reduced risk of use of unauthorized or stolen terminals; or detection of MITM or other attacks by RBSes. While the embodiments described herein generally focus on the use of an IMSI and an IMEI, it may be appreciated that these techniques may be applied to other forms of PII. For example, embodiments herein that process IMSIs can additionally or alternatively process other types of SID, such as a 5G SUPI. In some example 5G networks, a SUPI is allocated to each subscriber for 5G services. SUPIs can include, e.g., IMSIs or network access identifiers (NAIs). In some examples, embodiments herein that process IMEIs can additionally or alternatively process other types of TID, such as a PEI. In some example 5G networks, each terminal has a PEI for accessing 5G services. PEIs can include, e.g., IMEIs and IMEIs with software-version codes (IMEISVs).

In some examples, e.g., before, during, or after the initial attach process, a terminal sends a challenge to the home network, e.g., based on a shared secret known to the terminal and the network. If the home network responds correctly to the challenge, the terminal can determine that it is possible to communicate with a legitimate home network, even if via an RBS.

In some example, the terminal and the home network establish a strongly-encrypted tunnel, e.g., using the shared secret. In some examples, e.g., a Transport Layer Security (TLS) tunnel over a 2G data connection, the tunnel can provide stronger encryption or integrity protection of messages than does the network technology being used.

In some examples, the terminal determines communication parameters that depend on or are otherwise affected by the RF environment between the terminal and a BS. These parameters can include, e.g., timing advance and UE TX power. The home network can also retrieve these parameters from the base station the home network believes is serving the terminal. The network and terminal can exchange copies of the parameters over the strongly-encrypted tunnel. If the parameters seen by the network do not match those seen by the terminal, the terminal or network can determine that an attack (e.g., MITM) is under way. The parameters can also be used by the network to attempt to geolocate a rogue BS, in some examples.

In view of the foregoing and the detailed description herein, various aspects provide improved subscriber privacy, improved security, or reduced risk of MITM or DoS attacks. Steps of various methods described herein can be performed in any order except when otherwise specified, or when data from an earlier step is used in a later step. Example method(s) described herein are not limited to being carried out by components particularly identified in discussions of those methods.

Some example systems and techniques described herein can permit computing devices to communicate via telecommunications networks. The term "session" as used herein includes a communications path via at least one telecommunications network for exchange of data among two or more terminals. Example sessions include voice and video calls, e.g., by which human beings converse, a data communication session, e.g., between two electronic systems or between an electronic system and a human being, or a Rich Communication Services (RCS) session.

Some operations herein are mutually independent, i.e., neither requires as input any output of the other. Operations described herein as "mutually independent" (e.g., within a group of operations such as those of a method) can be performed in either order, in parallel, at least partly overlapping in time, or partly or wholly as a combined operation, in various examples. A later-run operation of two mutually independent operations may accept input(s) from the earlier-run of the two mutually independent operations, but is not required to wait for those input(s) or for completion of the earlier-run operation before executing.

As used herein, the term "unique identifier" and similar terms encompass both truly unique identifiers (e.g., Ethernet hardware addresses that are unique by construction, or Version 1 UUIDs) and identifiers with a negligible probability of collision (non-uniqueness) (e.g., SHA256 hashes of data uniquely identifying an object, or Version 4 UUIDs). As used herein, a "random" value can be a truly random value, e.g., measured from physical phenomena, or a pseudorandom value. Examples of random values include cryptographically-strong random numbers.

Illustrative Environments, Computing Devices, and Techniques

FIG. 1 illustrates an example network architecture 100 for a telecommunications network that provides for enhanced mobile subscriber privacy or detection of MITM attacks. FIG. 1 shows an example of a network architecture, and there may be other network architectures in which enhanced mobile subscriber privacy may be implemented. For brevity, not all connections between devices are shown. For examples, the devices within Evolved Packet Core (EPC) 112 can communicate with each other, even though the communications paths are not depicted on the drawing. The illustrated example includes three terminals 102(*a*), 102(*b*), and 102(*c*) (also referred to herein as "network terminals", and individually or collectively referred to herein with reference 102).

Terminal 102(*a*) connects to BS 104, e.g., a 2G BS or an evolved NodeB (eNB or eNodeB). BS 104 (or other edge components) connects via backhaul 106 with a core of a telecommunications network. Backhaul 108 also connects the core to an edge of the telecommunications network. BS 104 is a point in a telecommunications network that connects with terminals, such as terminal 102(a). BS 104 may send and receive wireless communications with terminal 102(a). In some 4G examples, BS 104 is connected with Mobility Management Entity (MME) 110 of EPC 112. In some example 5G networks, MME 110 represents a 5G Access and Mobility Management Function (AMF) or Session Management Function (SMF).

MME 110 is configured to find, route, maintain, and transfer communications. MME 110 is configured to perform end-to-end connection signaling and security services between core networks, and to maintain connection information about terminals, and determine which gateway is to be used to connect a terminal to another network. In some examples, an access network includes backhaul 106 and EPC 112, and provides communication between a terminal 102 and an application network (discussed below), e.g., an Internet Protocol (IP) Multimedia Subsystem (IMS) network or other network providing user-facing services to terminals 102. In some examples, the application network is an IMS that provides VoLTE service, or is the public Internet.

MME 110 is connected with Serving Gateway (SGW) 114 (e.g., an LTE SGW or 2G SGSN). SGW 114 is configured to route and forward data packets, and act as an anchor for network connectivity when terminal 102(a) is handed off from BS 104 to another BS (not shown). A terminal, such as terminal 102(a), may be associated with a single SGW, such as SGW 114, and MME 110 may determine that terminal 102(a) will utilize SGW 114 for a current session. In an architecture that includes a visited network and a home network, SGW 114 is also configured to be a point of contact between the visited network with the home network, by communicating with a packet gateway (PGW) (such as PGW 116, e.g., an LTE PGW or 2G GGSN) of the home network. In some example 5G networks, SGW 114 and PGW 116 represent an SMF or a User Plane Function (UPF). In addition to being configured to be a point of contact between the visited network and the home network, PGW 116 can be configured to perform such functions as managing quality of service (QoS) for communications, performing deep packet inspection, and performing a Policy and Charging Enforcement Function (PCEF).

PGW 116 communicates via internetwork 118 with data center 120. Internetwork 118 can be or include, e.g., the public Internet; a private IP Packet Exchange (IPX) such as defined by GSMA; or a virtual private network (VPN) tunnel or overlay on either of those. Data center 120 may include HLR/HSS 122, which in some examples may be an HLR, HSS, 5G UDM network function (NF), or 5G UDR. HLR/HSS 122 is a master user database that contains subscriber profiles for one or more terminal users that are associated with the home network, performs authentication and authorization for a user's terminal, and may provide information about a terminal's physical location and Internet Protocol information. In some example 5G networks, the illustrated HLR/HSS 122 represents a UDM/Authentication credential Repository and Processing Function (ARPF) node.

The other illustrated terminal 102(b) is also communicatively coupled to HLR/HSS 122, though via a different path through network architecture 100 than for terminal 102(a). Terminal 102(b) is communicatively coupled to residential hotspot 124. Residential hotspot is configured to provide a WIFI or cellular wireless communications link between terminal 102(b) and backhaul 108 (which is similar to backhaul 106), which in turn connects to ePDG 126 of EPC 112 (or corresponding components in other network technologies). ePDG 126 may secure a data transmission with a terminal, such as terminal 102(b), as it connects to EPC 112 via a communications link that does not adhere to a 3GPP protocol. In this capacity, ePDG 126 may serve as a termination node of an IPsec tunnel that is established with terminal 102(b).

Also present in this example network architecture 100 are six adversaries: IMSI catcher 128(a), IMSI catcher 128(b), IMSI catcher 128(c), IMSI catcher 128(d), IMSI catcher 128(e), and IMSI catcher 128(f). Each of these IMSI catchers may be implemented via hardware (such as system 200 of FIG. 2) or software components that are implemented on hardware. Each of these IMSI catchers is present at a different point in example network architecture 100, but is configured to capture a mobile subscriber's PII, such as an IMSI, or to otherwise negatively affect the privacy of network users or the operation of the network.

IMSI catcher 128(a) is active because it actively tries to obtain the IMSI of terminal 102(a) by emulating a rogue (e.g., fake) base station and inducing terminal 102(a) to connect to it instead of connecting with a real base station such as BS 104.

IMSI catcher 128(b) is configured to capture an IMSI transmitted between terminal 102(a) and BS 104. IMSI catcher 128(b) may be considered to be a passive IMSI catcher, in contrast to the active IMSI catcher 128(a). For example, IMSI catcher 128(b) can sniff packets transmitted wirelessly (or on a shared wired network, e.g., Ethernet) between terminal 102(a) and backhaul 106.

IMSI catcher 128(c) is configured to capture an IMSI transmitted between terminal 102(b) and residential hotspot 124. IMSI catcher 128(d) is configured to capture an IMSI as it is transmitted through backhaul 106. IMSI catcher 128(e) is configured to capture an IMSI as it is transmitted through EPC 112. IMSI catcher 128(f) is configured to capture an IMSI as it is transmitted through data center 120.

Each of these six IMSI catchers 128 may be utilized by an adversary to compromise mobile subscriber data. To reduce the risk of compromise of mobile subscriber data, network architecture 100 may be configured to implement one or more of the signal flow of FIG. 5 or the operating procedures of FIGS. 6-12.

Terminal 130 is an example of a terminal under control of (e.g., stolen by) an actor other than the subscriber associated with that terminal or a party authorized by that subscriber. Terminal 130 may or may not be used to carry out IMSI-catching, DDoS attacks, or other expressly malicious operations. Regardless, terminal 130 is being operated without consent of at least one of the subscriber or the network operator.

In some examples, EPC 112 and backhaul 106 are components of a serving network 132, and data center 120 is a component of a home network 134. This is represented by the dotted line in FIG. 1. In this example, terminals 102(a) and 102(b) are roaming in serving network 132 but issued by home network 134. A terminal can be roaming, e.g., when the terminal is connected via an access network operated by a network operator other than the terminal's home operator. The illustrated division is only one example; in other examples, terminals 102(a), 102(b) are connected to a backhaul or base station of home network 134.

In the illustrated example, serving network 132 or home network 134 can communicate via internetwork 118 with at least one application network 136. Application network 136 can provide user-facing services, e.g., voice or video calling, asynchronous messaging, or file transfer. For example, application network 136 can include an IMS network supporting VoLTE. Application network 136 can be part of serving network 132 or of home network 134, or can be separate from both networks 132, 134.

The illustrated terminal 102(c) is experiencing a MITM attack. Adversary system 138 ("MITM") includes rogue base station (RBS) 140, to which terminal 102(c) is connected. RBS 140 is connected with a proxy terminal 142, which emulates the behavior of a legitimate terminal 102. Proxy terminal 142 may or may not be implemented using actual mobile hardware. For example, proxy terminal 142 may be implemented together with (e.g., sharing antennas or other components with) RBS 140. Proxy terminal 142 communicates with BS 104. In this way, adversary system 138 can transmit messages from terminal 102(c) via RBS 140 and proxy terminal 142 to a legitimate serving network 132, and can transmit messages to terminal 102(c) via the reverse path. For example, adversary system 138 can proxy messages of an attach procedure between terminal 102 and BS 104. In some examples, terminal 102(c) is not aware that RBS 140 is a rogue BS, as opposed to a legitimate BS.

In some examples, in order to, e.g., validate the identity of serving network 132, establish secure communications, or detect MITM attacks such as conducted by adversary system 138, terminal 102(c) communicates with a verifier 144. Verifier 144 can include, e.g., a network agent or other software module running on a server, or a dedicated network device (e.g., an MME, HSS, SGSN, SGW, GGSN, PGW, or other network device). Verifier 144 can perform functions described herein with reference to FIGS. 2 and 5-9. Terminal 102(c) can perform functions described herein with reference to FIGS. 2 and 5-12. Verifier 144 and terminal 102(c) can interact to perform operations described herein.

As used herein, a message "sent to," "transmitted to," or "transmitted toward" a destination, or similar terms, can be sent directly to the destination, or can be sent via one or more intermediate network nodes or devices to the destination. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, or by changing a presentation of at least part of the message, e.g., from a Session Initiation Protocol (SIP) start-line to a SIP header or vice versa. As used herein, a "reply" message is synonymous with a "response" message. The term "reply" is used for clarity, e.g., when discussing reply messages sent in response to the receipt of messages. The phrase "communicatively connected" includes any type of connection, wired or wireless, for communicating data between devices or processors. These devices or processors can be located in physical proximity or not.

In some examples, one or more of the illustrated nodes, terminals, or network devices includes a server or server farm, multiple, distributed server farms, a mainframe, a work station, a PC, a laptop computer, a tablet computer, an embedded system, or any other sort of computing device or devices. In some examples, one or more of the illustrated nodes and network devices are computing nodes in a cluster computing system, e.g., a cloud service or other cluster system ("computing cluster" or "cluster") having several discrete computing nodes that work together to accomplish a computing task assigned to the cluster as a whole. In some examples, at least one illustrated component can be a client of a cluster and can submit jobs to the cluster and/or receive job results from the cluster. Nodes in the cluster can, e.g., share resources, balance load, increase performance, and/or provide fail-over support and/or redundancy. Additionally or alternatively, at least illustrated component can communicate with the cluster, e.g., with a load-balancing or job-coordination device of the cluster, and the cluster or components thereof can route transmissions to individual nodes.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with QoS guarantees, backup tape space and/or mounting/unmounting services, electrical power, etc.

In some examples, serving network 132 can be any sort of access network, such as a Generic Access Network (GAN), Unlicensed Mobile Access (UMA), Orthogonal Frequency Division Multiple Access (OFDM), General Packet Radio Service (GPRS), Advanced Mobile Phone System (AMPS), High Speed Packet Access (HSPA), or evolved HSPA (HSPA+) network;

a universal terrestrial radio network (UTRAN); an EDGE radio access network (GERAN); an evolved universal terrestrial radio access network (E-UTRAN); a WIFI (IEEE No. 802.11), IEEE No 802.15.1 (BLUETOOTH), or other LAN or PAN access network; a satellite or terrestrial wide-area access network such as a wireless microwave access (WIMAX) network; or a network of a type listed above BS 104 may use any sort of air interface, such as a code division multiple access (CDMA), time division multiple access (TDMA), or frequency division multiple access (FDMA). BS 104 may provide circuit-switched connections or packet-switched connections. Serving network 132 or home network 134 may include any network configured to transport IP packets, e.g., IPv4, IPv6, or any other evolution of an IP-based technology; or any network configured to transport SS7 MTP2 signal units (e.g., via MTP1 or SIGTRAN). In some examples, a non-cellular network can carry voice traffic using Voice-Over-IP (VoIP) or other technologies as well as data traffic, or a cellular network can carry data packets using High Speed Packet Access (HSPA), LTE, or other technologies, as well as voice traffic. Some cellular networks carry both data and voice in a PS format. For example, many LTE networks carry voice traffic in data packets according to the voice-over-LTE (VoLTE) standard.

Figure 2:
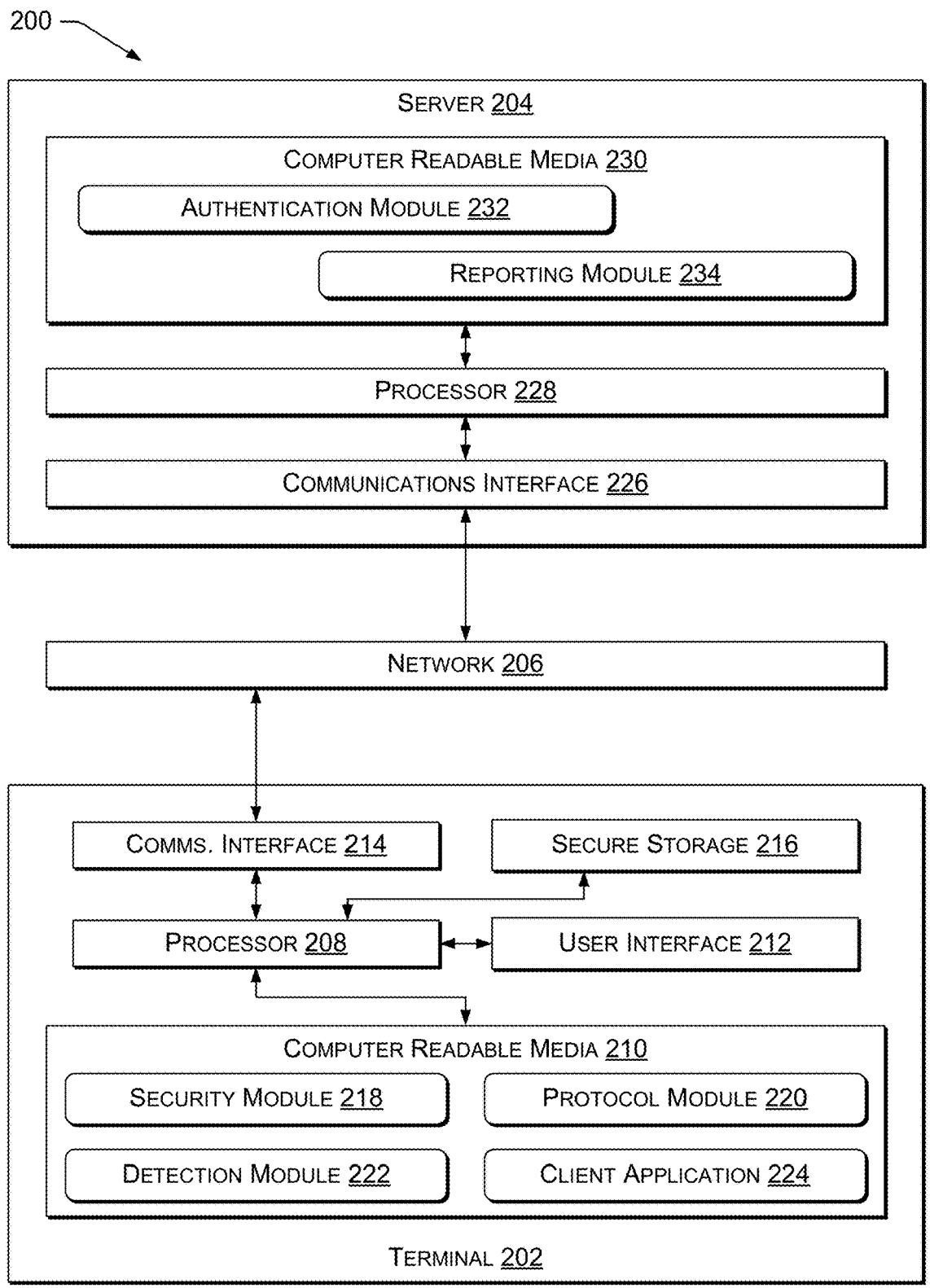
FIG. 2 is a high-level diagram showing the components of a data-processing system.

FIG. 2 is a block diagram illustrating a system 200 permitting validation of networks, responding to challenges from terminals, or detection of attacks according to some implementations. The system 200 includes a terminal 202 (which can represent any terminal 102) communicatively connectable with a server 204 via a network 206. The server 204 can represent a verifier 144 or another control system of a telecommunications network configured to perform functions described herein. Server 204 can be implemented using dedicated or shared (e.g., cloud) computing hardware. The network 206 can include one or more networks, such as a cellular network, e.g., 2G-5G, or a non-cellular network, e.g., WIFI or WIMAX. Example network technologies are described above with reference to FIG. 1. In some examples, a verifier or terminal can include one or more components shown in FIG. 2, and can connect to one or more wired or wireless networks.

The terminal 202 can include one or more processors 208, e.g., one or more processor devices such as microprocessors, central processing units (CPUs), microcontrollers (MCUs), field-programmable gate arrays (FPGAs), application-specific integrated circuits (ASICs), programmable logic devices (PLDs), programmable logic arrays (PLAs), programmable array logic devices (PALs), or digital signal processors (DSPs). Terminal 202 can include one or more computer-readable media (CRM) 210, such as semiconductor memory (e.g., RAM, read-only memory (ROM), solid state drives (SSDs), or the like), disk drives (e.g., platter-based hard drives), another class of computer-readable media, or any combination thereof. The terminal 202 can further include a user interface (UI) 212, e.g., including an electronic display device, a speaker, a vibration unit, a touchscreen, or other devices for presenting information to a user and receiving commands from the user. The terminal 202 can further include one or more communications interface(s) 214, e.g., radio(s) or other network interface(s), configured to selectively communicate (wired or wirelessly) via the network 206, e.g., via a serving network 132 or other access network.

Terminal 202 can also include a secure storage unit 216, e.g., a SIM or USIM card. Secure storage unit 216 can include a non-volatile memory, a processor, security logic, or other components to perform authorization or authentication functions. In some examples, secure storage unit 216 stores a key, e.g., a secret key shared between terminal 102, 202 and home network 134 (e.g., verifier 144).

CRM 210 can be used to store data and to store instructions that are executable by the processors 208 to perform various functions as described herein. CRM 210 can store various classes of instructions and data, such as an operating system, device drivers, program modules, etc. The processor-executable instructions can be executed by the processors 208 to perform the various functions described herein. CRM 210 can be or include computer-readable storage media. Computer-readable storage media include, but are not limited to, registers, floppy disks, hard disks, SSDs, bar codes, Compact Discs (e.g., CD-ROM), digital versatile disks (DVDs), other optical storage, ROM, erasable programmable read-only memories (EPROM, EEPROM, or Flash), random-access memories (RAMs), other semiconductor memory technology, magnetic cassettes, magnetic tape, magnetic disk storage or other magnetic storage devices, or any other tangible, non-transitory medium which can be used to store the desired information and which can be accessed by the processors 208. The term "non-transitory", as used herein, is a characterization of the medium itself (i.e., not a propagating electromagnetic signal) and does not imply any limitation with regard to data storage persistency. In some examples, CRM 210 can include a non-volatile memory, e.g., in a SIM card. In some examples, CRM 210 does not include a SIM card, and terminal 202 includes a secure storage unit 216 comprising a SIM card.

CRM 210 can include processor-executable instructions of a security module 218, a protocol module 220, a detection module 222, and a client application 224. In some examples, terminal 202 can be configured to, e.g., by executing modules 218-222, validate a home network or detect an attack, e.g., a rogue serving network or a rogue home network (RHN). For example, security module 218 can perform operations 602-614, 628, 630, 702-710, 814, 816, 904, 908, 1002-1016, 1104, 1106, 1120-1126, or 1202-1218.; protocol module 220 can perform operations 602, 616, 620, 702, 802, 902, 1002, 1104, 1106, 1108, 1112, or 1116; or detection module can perform operations 620, 624, 802, or 916.

In some examples, terminal 202 can be configured to, e.g., by executing the processor-executable instructions of client application 224, initiate or receive sessions, attach to networks, or handover between networks, e.g., as defined in 2G, 3G, 4G, 5G, and IMS specifications. The client application 224, e.g., a native or other dialer, can permit a user to originate and receive communication sessions, e.g., voice or Unstructured Supplementary Service Data (USSD), associated with the terminal 202. The client application 224 can additionally or alternatively include an Short Message Service (SMS), RCS, or presence client, or a client of another telephony service offered by the server 204.

In some examples, server 204 can communicate with (e.g., is communicatively connectable with) terminal 202 or other nodes or devices via network 206 using one or more communications interface(s) 226, e.g., network transceivers for wired or wireless networks, or memory interfaces. Example communications interface(s) 226 can include Ethernet or FIBRE CHANNEL transceivers, WIFI radios, or DDR memory-bus controllers (e.g., for DMA transfers to a network card installed in a physical server 204). Communications interface(s) 214 can include any of the components described in this paragraph.

The server 204 can include one or more processors 228 and one or more CRM 230. CRM 230 can be used to store processor-executable instructions of an authentication module 232 or a reporting module 234. The server 204 can be configured to, by executing modules 232-234, respond to challenges, query communication parameters, exchange parameters, or detect attacks, e.g., as discussed herein with reference to FIGS. 5-12. For example, the authentication module 232 can establish the network side of a wireless communication link (e.g., the network counterpart of operations 602, 702, 1002, 1104, 1106 (for network-triggered handover), 1108, 1112) receive a challenge 606 and determine a response 612 (e.g., according to any of the challenge-response protocols described herein); or establish the server 204 side of a secure network tunnel 618 (e.g., using any of the tunneling protocols described herein with reference to operations 616, 902, 1116). In some examples, the reporting module 234 can query a base station 104 for communication parameters 626 (e.g., operations 620, 802); transmit parameters 626 to terminal 102 (e.g., the network counterpart of operations 624, 806); receive parameters (e.g., operations 624, 806, 912); detect an attack based on parameter mismatches (e.g., operations 628, 814, 1016, 1124); provide notifications (e.g., operations 630, 706, 710, 816, 904, 908, 1126); or determine spatial estimates (operation 916).

In some examples, server 204 also includes or is communicatively connected with a UI 212 or similar subsystem. For example, server 204 can transmit Web pages and related data rendered by a browser on terminal 202 or another computing device, and can receive responses from those Web pages.

In some examples, processor 208 and, if required, CRM 210, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (e.g., physically or via blown fuses or logic-cell configuration data) to perform functions described herein. A control unit of the latter type may not require or include a CRM 210, but may still perform functions described herein in terms of modules stored on CRM 210. Other examples of control units can include processor 228 with, if required, CRM 230.

For brevity, discussions of functions performed "by" module(s) (or similar terms) refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s). Various aspects herein may be embodied as computer program products including computer-readable program code ("program code") stored on a computer-readable medium, e.g., a tangible, non-transitory computer-readable medium.

Illustrative Techniques and Dataflows

Figure 3:
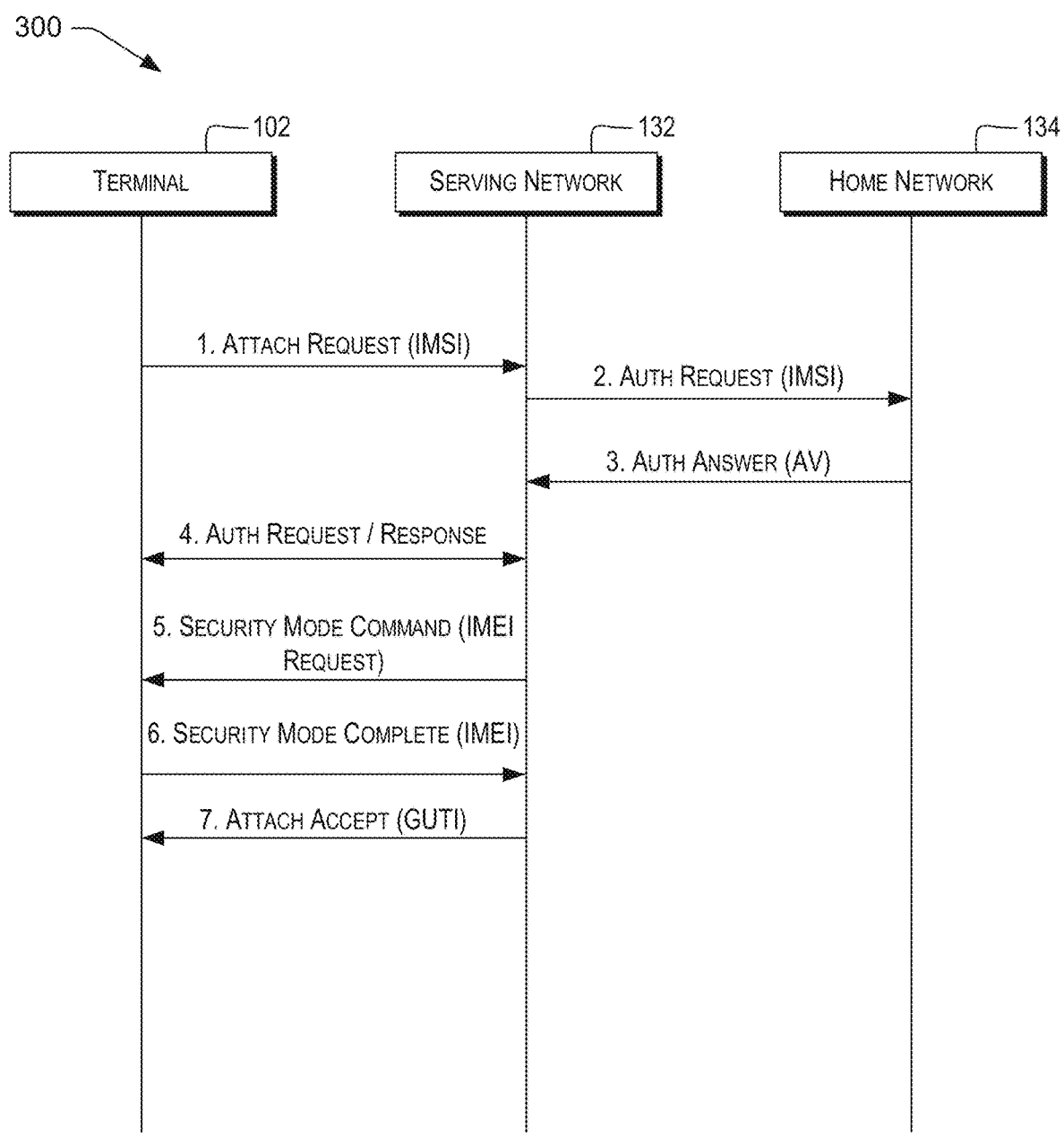
FIG. 3 shows a call flow of an attach procedure according to some prior schemes.
Figure 4:
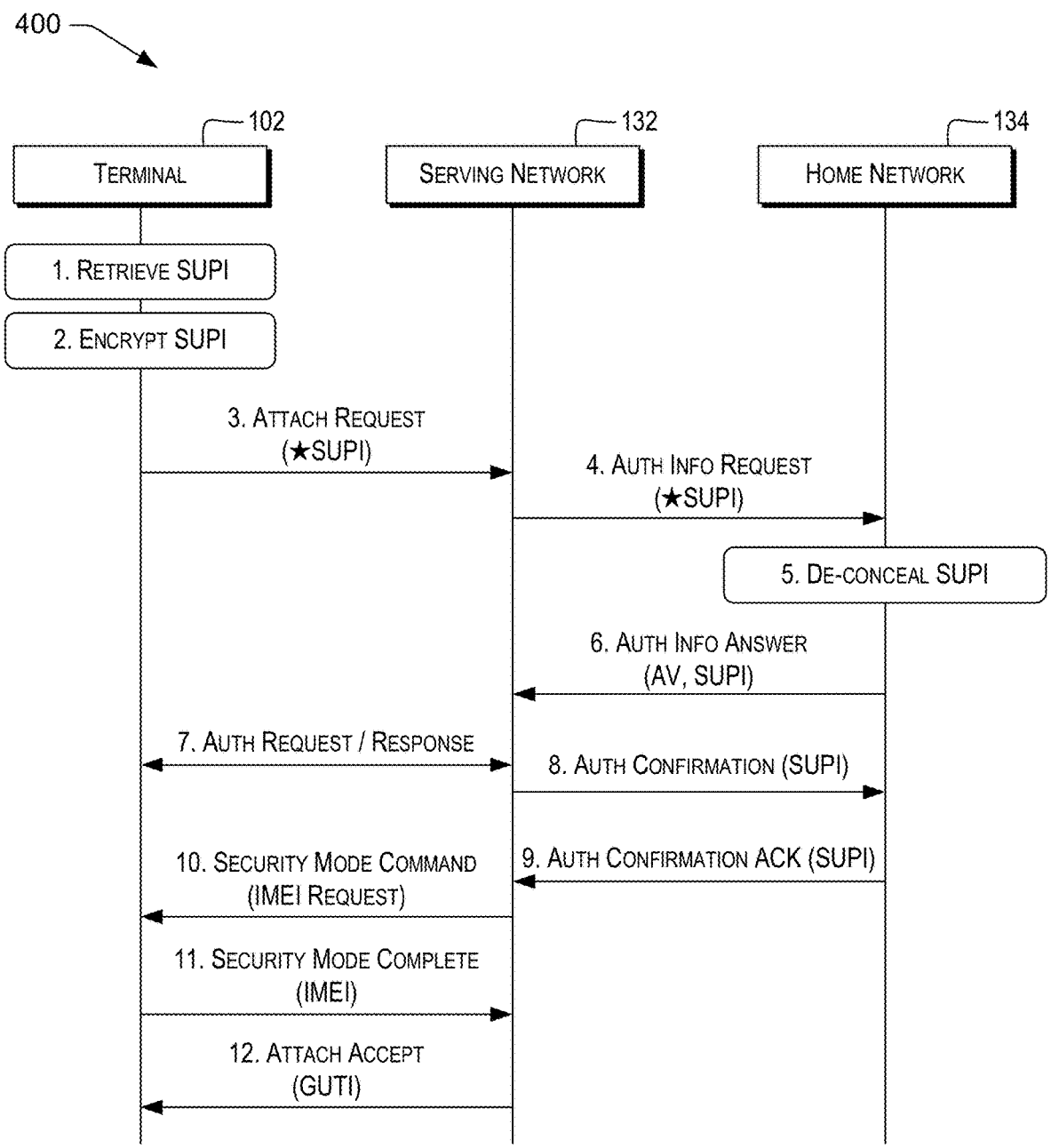
FIG. 4 shows a call flow of another attach procedure.
Figure 5:
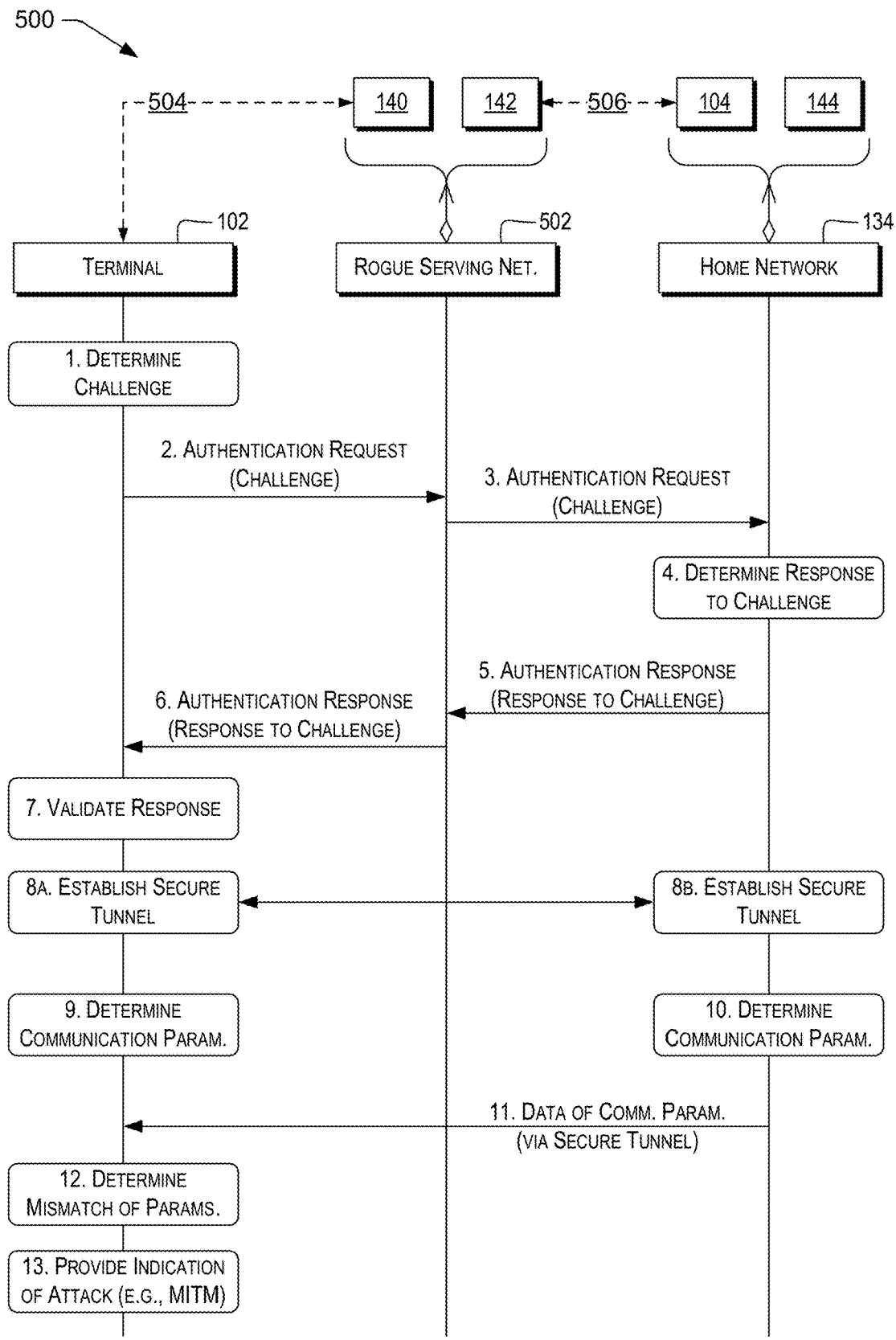
FIG. 5 shows a call flow of an example security procedure including verification by a terminal of a home network and a serving network.

FIGS. 3-5 show various examples of dataflows between a terminal 102, at least one component of a serving network 132 (e.g., a BS 104 or RBS 140), and at least one component of a home network 134 (e.g., a verifier 144). For brevity, operations or data transfers in FIGS. 3-5 are numbered beginning from 1 independently in each figure. The reuse of numbers through FIGS. 3-5 does not imply that the similarly-numbered operations or data transfers are identical operations or data transfers, unless expressly indicated. In FIGS. 3-5, "★" (star) marks an encrypted value and ":" (colon) denotes concatenation. Values shown as concatenated can be concatenated in any order, and can be packed or interleaved in addition to or instead of being adjoined as indivisible units. Moreover, any illustrated (e.g., numbered) operation or data transfer can be performed using multiple coordinated operations or data transfers, respectively.

In some nonlimiting examples, the connection between terminal 102 and serving network 132 is wireless, and the connection between serving network 132 and home network 134 is wired. The illustrated examples show a roaming configuration. However, similar exchanges take place in a non-roaming configuration, in which the exchanges shown associated with serving network 132 are also performed by home network 134. This document expressly contemplates methods at each of terminal 102, serving network 132, and home network 134 for conducting the illustrated data exchanges and operations.

Various examples herein use one or more transaction-specific values (TSVs), e.g., at least one cryptographic nonce or salt value. A TSV as described herein can be, e.g., a cryptographically-strong random number or other random value. In some examples, a TSV can be or include a data value (e.g., a random number) that does not have the same value for multiple consecutive transactions of a particular type. Using TSVs can reduce the chance of an adversary's performing a replay attack or known-plaintext attack.

In some examples, any encryption ("★") operation herein can include TSV(s) (e.g., nonce(s)) or other techniques for preventing replay attacks. Any encryption operation of more than one value ("★$(a_l, \ldots, a_n)$") can additionally or alternatively be performed as separate encryptions of at least one of those values (e.g., "$(★a_l, \ldots, ★a_n)$").

FIG. 3 shows a prior scheme 300 in which the IMSI is sent in the clear in an attach request (#1) from terminal 102 to serving network 132. Serving network 132 is shown as separate from home network 134 for generality (e.g., roaming configurations). However, this is not limiting. In some examples of FIGS. 3 and 4 (e.g., non-roaming configurations), home network 134 can participate in exchanges shown with respect to both home network 134 and serving network 132. Accordingly, in some of these examples of FIGS. 3-4, terminal 102 can communicate directly with home network 134. Serving network 132 transmits a corresponding authentication request (#2) (e.g., an EPS authentication data request) to home network 134, which responds with an authentication answer (#3) (e.g., an EPS authentication data response) containing an authentication vector (AV). Home network 134 determines the AV based at least in part on the provided IMSI. In some examples, home network 134 determines the AV based at least in part on an ID of serving network 132.

Serving network 132 then conducts an authentication request/response exchange (#4) with terminal 102 using on the AV. Exchange #4 can include, e.g., an LTE or 5G a Authentication Request from an MME 110 of serving network 132 to terminal 102, and an Authentication Response from terminal 102 to the MME 110. When exchange #4 is completed successfully, serving network 132 (e.g., the MME thereof) issues a Non-Access Stratum (NAS) Security Mode Command (SMCmd) (#5) requesting the IMEI (or IMEISV) of terminal 102. Terminal 102 responds with an NAS Security Mode Complete message (SMCo) (#6) including the IMEI (or IMEISV). After #6, NAS signaling is cryptographically protected against interference. Serving network 132 then sends an Attach Accept message (#7) to complete the attach procedure. The Attach Accept message (#7) includes a Globally Unique Temporary ID (GUTI) identifying terminal 102 while terminal 102 is attached to serving network 132.

In some examples, at the option of serving network 132, messages #5 and #6 may not be exchanged, and terminal 102 may not provide its IMEI to serving network 132. In other examples, terminal 102 may not provide the IMEI in message #6. Therefore, in some prior schemes the IMEI may never be verified, permitting use of a valid IMSI on a stolen phone. Furthermore, some examples of the depicted scheme permit IMSI catcher 128(b) to sniff the cleartext IMSI from #1, or to sniff the cleartext IMEI from #6. For example, messages #5 and #6 may not be encrypted, e.g., for emergency calls.

FIG. 4 shows another scheme 400 in which SUPI is encrypted initially (operations #1 and #2, which may be combined). In some examples, SUPIs or other subscriber identifiers (SIDs) can include IMSIs or other subscriber identifiers. In some examples, TIDs can include IMEIs, network-adapter Media Access Control (layer 2) addresses, or other equipment identifiers.

For example, some 5G schemes encrypt the SUPI (#2) before transmitting it in the attach request (#3). Therefore, neither IMSI catcher 128(b) nor serving network 132 can access the SUPI before it is decrypted by the home network (#5). However, home network 134 still provides the SUPI to serving network 132 (#6) to permit authentication request/response exchange (#7) to take place. Therefore, serving network 132 has access to the SUPI.

After exchange #7 succeeds, serving network 132 and home network 134 exchange an authentication confirmation (#8) and acknowledgement (#9) so that home network 134 is aware that the authentication was successful. Serving network 132 then exchanges NAS Security Mode messages #10 and #11 with terminal 102 and accepts the attach (#12), as discussed herein with reference to FIG. 3 #5-#7. However, the IMEI may still be exchanged in the clear in #10 and #11.

In some 5G examples, the SUPI is asymmetrically encrypted at #2 with the public key of home network 134. This permits home network 134 to decrypt the SUPI, but not serving network 132. However, this does not permit detecting whether serving network 132 includes an RBS 140, since an RBS 140 can transparently proxy the encrypted SUPI to home network 134. Moreover, in some older network technology generations, RBS 140 may be able to break the encryption of the SUPI (e.g., the IMSI in 2G), which may permit redirecting communications away from home network 134 to an REIN.

FIGS. 5-12 show various examples of increasing security compared to FIGS. 3 and 4. Some described examples also provide increased protection against malicious network nodes that are trying to collect authentication vectors, SIDs, TIDs, or other PII, as described below. Various examples can be used for 2G-5G networks, or for future IP-based networks having corresponding message exchanges. For brevity, some examples are illustrated in the context of LTE or 5G systems; however, the depicted examples are not limited to LTE or 5G systems unless expressly indicated.

FIG. 5 shows an example 500 in which the home network 134 is authenticated to the terminal 102, and radio characteristics are used to detect MITM attacks. This permits terminal 102 to confirm the identity of home network 134 and determine whether or not a serving network 132 is conducting an attack. This can, e.g., provide additional security, even in older network technology generations for which the protocol-provided security mechanisms may be unable to block or detect adversaries or attacks. Although the example of FIG. 5 specifically shows a rogue serving network, the illustrated operations and messages can be used to detect rogue home networks or rogue serving networks connected to rogue home networks. The illustrated operations and messages can additionally or alternatively be used to communicate with legitimate serving networks 132 and home networks 134 configured to carry out the illustrated operations.

In the illustrated example, terminal 102 is configured to perform operations #1, #7, #8, #9, #12, and #13, e.g., under control of the security module 218, protocol module 220, or detection module 222. Rogue serving network 502 (which can represent adversary system 138) is an adversary-controlled serving network 132 including RBS 140 and proxy terminal 142, FIG. 1. Home network 134 includes BS 104, and includes verifier 144 configured to carry out operations #4, #8, and #10, e.g., under control of the authentication module 232 or reporting module 234. Solely for purposes of illustration, two RF environments are shown (depicted as dashed arrows): environment 504 between terminal 102 and RBS 140, and environment 506 between proxy terminal 142 and legitimate BS 104.

In operation #1, terminal 102 determines a challenge. The challenge can be determined based on a secret key shared with home network 134, a cryptographic certificate of home network 134, or other information usable by home network 134 to authenticate itself to terminal 102. In some examples, the challenge-response protocol uses stronger cryptography (e.g., longer key lengths, or stronger algorithms) than the network protocol(s) or technology generation used to carry messages between terminal 102 and rogue serving network (RSN) 502 (or other serving network 132). Examples are discussed herein, e.g., with reference to operation 604, FIG. 6.

Message #2 is an authentication request sent by terminal 102 to RSN 502 (or other serving network 132) (e.g., BS 104 or RBS 140) for transmission to home network 134 (message #3). The authentication request includes the challenge. Examples are discussed herein, e.g., with reference to operations 602 and 608.

At operation #4, home network 134 (e.g., verifier 144) determines a response to the challenge, e.g., as set forth in the challenge-response protocol in use. Examples are discussed herein, e.g., with reference to FIG. 6. Home network 134 sends an authentication response (message #5), including the response to the challenge, to RSN 502 for transmission (as message #6) to terminal 102. Examples are discussed herein, e.g., with reference to operation 610.

At operation #7, terminal 102 determines whether or not the response to the challenge (from message #6) is valid. Operation #7 can include validating the response against the key or certificate discussed above with reference to operation #1. If the response to the challenge is valid, terminal 102 can determine that home network 134 is a legitimate home network. If the response to the challenge is not valid, terminal 102 can determine that at least one of RSN 502 (or other serving network 132) and home network 134 is rogue.

If home network 134 is valid, at operation #8 (which includes terminal operation #8a and home-network operation #8b), terminal 102 and home network 134 cooperate to establish a secure network tunnel between them via RSN 502. In some examples, the secure network tunnel uses stronger cryptography than the network protocol(s) or technology generation used to carry messages between terminal 102 and home network 134. In these and other examples, the secure network tunnel can provide secure communication between terminal 102 and home network 134 even via an RBS 140 or other component of RSN 502. Examples are discussed herein, e.g., with reference to operation 616.

At operation #9, terminal 102 can determine a first communication parameter associated with communication between terminal 102 and RSN 502. For example, the first communication parameter can include round-trip time, timing advance, radio link balance, transmit power, or other parameters that are influenced by the RF environment between terminal 102 and RSN 502. In architecture 100, the first communication parameter characterizes or is affected by the RF environment between terminal 102(c) and RBS 140. Examples are discussed herein, e.g., with reference to operation 620.

At operation #10, home network 134 can determine a second communication parameter associated with communication between at terminal and BS 104 known to home network 134. For example, verifier 144 can query BS 104 In architecture 100, the second communication parameter characterizes or is affected by the RF environment between proxy terminal 142 and BS 104. Home network 134 can send data indicating the second communication parameter in message #11 via the secure network tunnel. Examples are discussed herein, e.g., with reference to operation 624.

At operation #12, terminal 102 can determine that the first and second communication parameters do not match. In a normal operation, the first and second communication parameters would match, since the first parameter would be provided to terminal 102 by BS 104 of RSN 502, and the second parameter would be provided to home network 134 by BS 104 of serving network 132. Therefore, a mismatch between the first and second communication parameters can indicate that an attack is under way, e.g., a MITM or DoS attack. Examples are discussed herein, e.g., with reference to operation 628.

At operation #13, in response to the determination at operation #12, terminal 102 can provide an indication that an attack is under way against terminal 102. For example, terminal 102 can present the indication via UI 212 or transmit the indication via the secure network tunnel to home network 134. Examples are discussed herein, e.g., with reference to operation 630.

In some examples, operations #1-#7 are used to authenticate home network 134 to terminal 102. For example, security module 218 can perform operations #1 and #7, and authentication module 232 can perform operation #4. In some examples, operation #8 is used to establish secure communications. For example, security module 218 or protocol module 220 can carry out operation #8a, and authentication module 232 or another module not shown can carry out operation #8b. In some examples, operations #9-#13 are used to detect attacks, e.g., MITM or DoS attacks. For example, protocol module 220 can carry out operation #9; reporting module 234 can carry out operation #10 or transmit message #11; or detection module 222 can carry out operations #12 and #13.

In some examples, detection of attacks is handled by home network 134 instead of or in addition to by terminal 102. In some of these examples, message #11 is sent from terminal 102 to home network 134 carrying data of the first communication parameter, and operations #12 and #13 are performed at home network 134 to compare the received first communications parameter to the determined second communications parameter. Operation #13 can include sending the indication via the secure network tunnel to terminal 102. Various examples include combinations of any of the groups of operations described in this paragraph or the preceding paragraph.

In some examples, (a) RSN 502 operates in a stand-alone configuration, without a connection to home network 134; or (b) RSN 502 communicates with an REIN instead of a legitimate home network 134. In some examples of (a) and (b), therefore, RSN 502 is unable to simulate processing of operation #4. Accordingly, even if RSN 502 synthesizes an authentication response #6, operation #7 at terminal 102 will fail. This permits terminal 102 to determine, in response to the failure at operation #7, that a connection to legitimate home network 134 is not available. In some of these examples, operations #8a-#13 are not performed if RSN 502 is operating standalone or with an REIN.

Illustrative Dataflows and Processes

Figure 6:
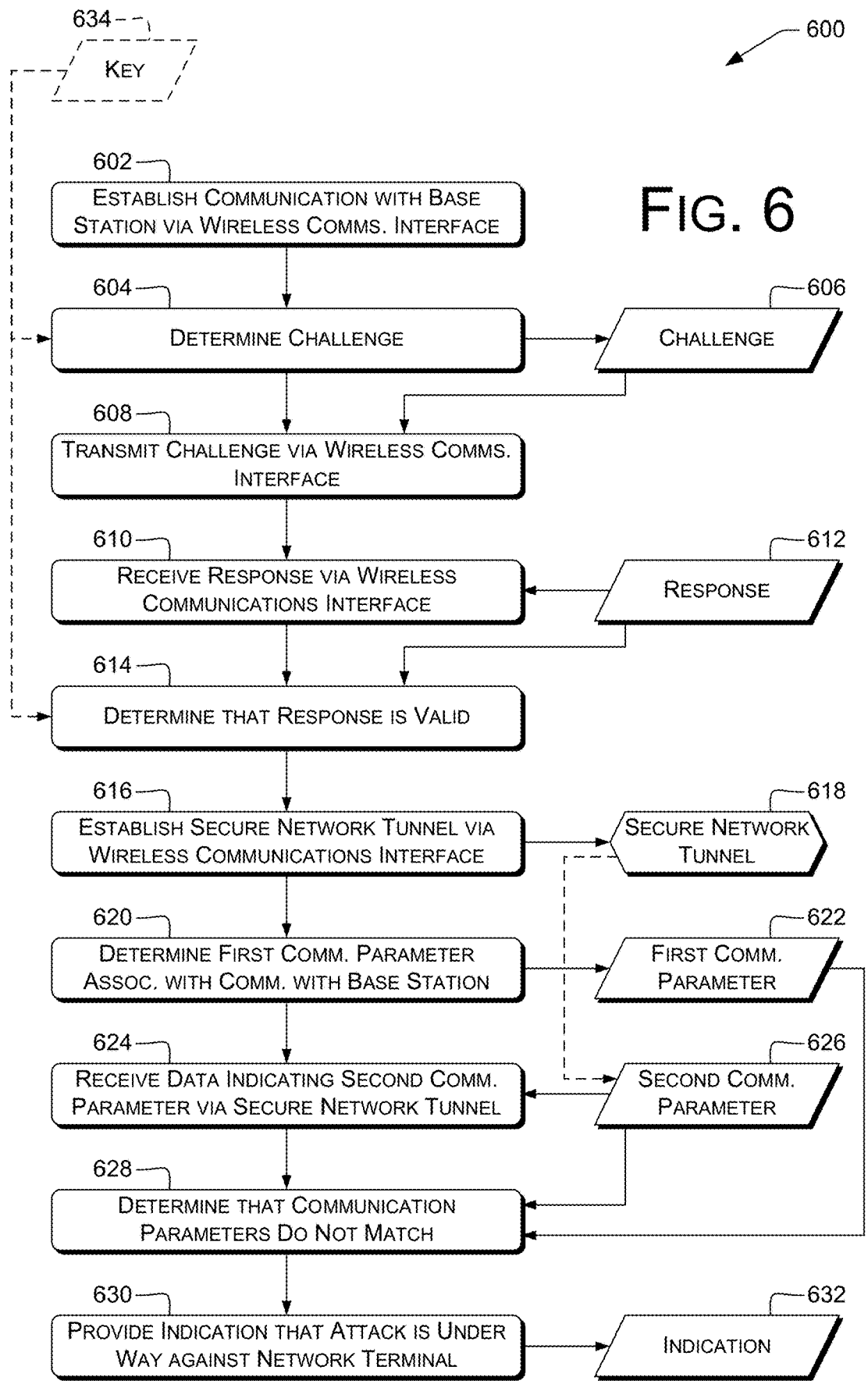
FIG. 6 is a dataflow diagram of an example process for validating a network and detecting an attack (e.g., a man-in-the-middle attack) against a network terminal.

FIG. 6 is a dataflow diagram illustrating an example process 600 for authorizing a network and detecting an attack, and related data items. Process 600 can be performed, e.g., by terminal 102, 202. The terminal 102 can include a wireless communications interface (e.g., communications interface 214) and a secure storage unit 216. In some examples, terminal 102 includes a control unit. For example, terminal 102 can include one or more processors (e.g., processor 208) configured to perform operations described below, e.g., in response to computer program instructions of security module 218, protocol module 220, or detection module 222. In some nonlimiting examples, at least one of the processes shown in FIGS. 6-12 does not include performing a TLS handshake. In some nonlimiting examples, all of the processes shown in FIGS. 6-12 exclude performing a TLS handshake.

Operations shown in FIG. 6 and in FIGS. 7-12, discussed below, can be performed in any order except when otherwise specified, or when data from an earlier step is used in a later step. For clarity of explanation, reference is herein made to various components shown in FIGS. 1 and 2, or to operations shown in FIGS. 3-5, that can carry out or participate in the steps of the example process, and to various operations and messages shown in FIGS. 3-5 that can occur while the example process is carried out or as part of the example process. It should be noted, however, that other components can be used; that is, example process(es) shown in FIGS. 6-12 are not limited to being carried out by the identified components, and are not limited to including the identified operations or messages.

At 602, the control unit can establish communication with a base station (e.g., RBS 140) via the wireless communications interface 214. For example, the control unit can transmit a Random Access message, e.g., the initial message sent from terminal 102 to begin attachment to serving network 132, an RRC connection request, a PDN connectivity request, a UDP packet, a TCP SYN, or another request to establish a connection using a predetermined protocol. In some examples, operation 602 includes transmitting an initial attach request (e.g., an LTE Random Access preamble or RRC connection request).

In some examples, operation 602 includes transmitting a SID, e.g., an IMSI, to serving network 132. Further examples using IMSIs are described herein with reference to FIG. 7.

In some examples, terminal 102 has a network-assigned temporary identity (herein, "NATI"), e.g., a TMSI, Cell Radio Network Temporary Identifier (C-RNTI), or Temporary C-RNTI (T-CRNTI). In some of these examples, operation 602 includes establishing the communication using the NATI of terminal 102. For example, if terminal 102 was previously connected to a network and received a TMSI, terminal 102 can use the TMSI when roaming or reconnecting after a loss of signal. This can permit connecting without exposing the IMSI to an adversary. For brevity herein, a SID that is directly associated with a user, e.g., an IMSI or SUPI, is referred to as a "User SID" or "USID".

At 604, the control unit can determine a challenge 606. The challenge can be determined as in any challenge-response protocol, e.g., CHAP, ssh, LTE-AKA, EAP-AKA, EAP-TLS, or EAP-TTLS. The challenge 606 can be sent in authentication request message #2, FIG. 5.

At 608, the control unit can transmit the challenge 606 via the wireless communications interface 214. For example, the control unit of the terminal 102 can transmit the challenge 606 to the verifier 144 of home network 134, or to another network node. The challenge 606 can be transmitted over a protocol associated with the established communication (operation 602). In some examples in which operation 602 includes sending an RRC Connection Request message, operation 608 can include sending the challenge 606 encapsulated in an RRC message, or sending the challenge 606 in a Packet Data Convergence Protocol (PDCP) packet via a data radio bearer (DRB) allocated according to RRC transmissions.

At 610, the control unit can receive a response 612 via the wireless communications interface 214, e.g., via a DRB or a packet according with the protocol used at operation 602. The response 612 can be received in an authentication response message #6, FIG. 5.

In some examples, if no response 612 is received, e.g., before the expiration of a timeout, the control unit can determine that an attack is under way. In such examples, operation 608 can be followed by operation 630. Examples are discussed herein, e.g., with reference to FIG. 10 or 12.

At 614, the control unit can determine that the response 612 is valid. In some examples, if the response 612 is not valid, the control unit can determine that an attack is under way. In such examples, operation 610 can be followed by operation 630. Examples are discussed herein, e.g., with reference to FIGS. 10-12.

At 616, the control unit can establish a secure network tunnel 618 via the wireless communications interface 214 to a network node at least partly in response to the determining that the response 612 is valid. The network node can be verifier 144 or another node of legitimate home network 134. Operation 616 can include exchange of messages (at operations #8a and #8b, FIG. 5) defined in the standard for the tunneling protocol in use. Operation 616 can include negotiating the tunneling protocol or cipher suite to use, in some examples. Challenge-response procedures (operations 604-614), or tunnel establishment (operation 616), can include various cryptographic operations. Examples include encrypting data with a public key, signing data with a private key, encrypting data with a private key, and determining keys using Diffie-Hellman or another key-exchange protocol.

In some examples, terminal 102 and home network 134 can establish, according to the respective standards, a TLS-secured connection, a secure GPRS Tunneling Protocol (GTP) connection (e.g., GTP-U), a secure Proxy Mobile IP (PMIP or PMIPv6) connection, an ssh connection, a secure Point-to-Point Protocol (PP) connection, an IPsec connection, a Layer 2 Tunneling Protocol (L2TP) connection, or another secure connection (e.g., a Virtual Private Network, VPN, connection). Secure network tunnel 618 can carry traffic in one or more protocols. Secure network tunnel 618 can provide the carried traffic with integrity protection (e.g., checksumming), eavesdropping resistance (e.g., encryption), compression, or other services, in any combination.

In some examples, operation 616 includes establishing the secure network tunnel 618 based at least in part on: a key 634 (discussed below), or a certificate stored in the secure storage unit and associated with the network node (e.g., verifier 144 or another node of home network 134). For example, the secure network tunnel 618 can encrypt or protect the integrity of transmissions using a session key determined based at least in part on a shared secret key 634. Additionally or alternatively, the secure network tunnel 618 can be or include a TLS connection (e.g., https), and the certificate can be a TLS certificate of the network node.

Secure network tunnel 618 can be carried via any underlying network transport, e.g., TCP, UDP, raw IP, or PDCP. For example, secure network tunnel 618 can be established via a mobile data connection between terminal 102 and BS 104 or RBS 140. Secure network tunnel 618 can additionally or alternatively be carried by another communication mechanism. For example, datagrams of secure network tunnel 618 can be carried via an SMS transport, e.g., in SMS messages using the "8-bit data" coding scheme. Compression, content-transfer encoding, fragmentation, or other techniques can be used to adapt transmissions of secure network tunnel 618 to SMS or other underlying transports (e.g., to encode binary data in text form).

At 620, the control unit can determine a first communication parameter 622 associated with the communication with the base station. For example, the control unit can query communications interface 214 (e.g., cellular radio electronics) for first parameter 622, or retrieve parameter 622 from a RAM or other CRM 210.

In some examples, parameter 622 can include a value of at least one of the types listed in this paragraph. Parameter 622 can be expressed as one or more analog values. Additionally or alternatively, parameter 622 can be expressed as one or more digital values quantized to respective numbers of bits. Additionally or alternatively, parameter 622 can be expressed as a digital or other discrete value in a predetermined enumerated type, e.g., defined in a 3GPP, IETF, or other standard. Value types include, but are not limited to: round-trip time (e.g., between terminal 102 and BS 104 or RBS 140), timing advance (e.g., an integer number of 16-sample groups or n-sample groups for $n \in \mathbb{Z} \neq 16$) (e.g., provided by BS 104 or RBS 140), open-loop transmission power, closed-loop transmission power control, measured power of a reference signal (e.g., received at terminal 102) (e.g., transmitted by BS 104 or RBS 140), or measured multipath characteristics (e.g., measured intersymbol interference, ISI, or measured power at one or more reference frequencies, e.g., as an indication of multipath fading).

Open-loop transmission power can be determined, e.g., by receiving a reference signal, and corresponding transmitted-power information, from a BS 104 or RBS 140. The open-loop transmission power can be set to a value positively correlated with the magnitude of the difference between the received reference-signal power and the indicated transmitted power of the reference signal (higher path loss correlates with higher open-loop transmission power). Closed-loop transmission power control (TPC) values, or timing advance (TA) values, can be provided by BS 104 or RBS 140.

Value types can additionally or alternatively include, but are not limited to, a most-recently-transmitted command from base station to terminal, or terminal to base station, e.g., a most-recently-transmitted timing-advance command from BS 104 or RBS 140 (a six-bit value), or an uplink or downlink allocation by the base station to the network terminal (e.g., numbers of one or more physical resource blocks (PRBs) on which the terminal may transmit, or should receive, data, respectively).

In some examples, value types can additionally or alternatively include hashes. For example, parameter 622 can be or include a hash, e.g., a SHA-256 or other cryptographic hash, of any of the values described above or elsewhere herein for communication parameters (e.g., parameter 622). For example, a hash can be determined of a block of data that includes a timing advance value or other value described above. That hash can then be used as parameter 622. Hashes can be used, e.g., to provide a fixed-size representation of a variable-length block of data, e.g., the list of all PRBs allocated to terminal 102 within the last $n \geq 1$ transmission time intervals (TTIs).

At 624, the control unit can receive data indicating a second communication parameter 626 via the secure network tunnel 618. Second parameter 626 can be of the same type as first parameter 622. For example, the control unit can receive a JSON, XML, or other payload carrying a string, floating-point, fixed-point, or other representation of the second parameter 626. Receiving second parameter 626 via the secure network tunnel 618 (e.g., via a transmission with integrity protection, such as via a message authentication code (MAC)) can permit the control unit to rely on second parameter 626 in operation 628.

At 628, the control unit can determine that the first communication parameter 622 does not match the second communication parameter 626. For example, terminal 102 can determine that first and second protocol values or other discrete-valued communication parameters are not equal, or that numerical parameter values (e.g., integer, fixed-point, or floating-point numbers, or analog values) differ from each other by more than 1%, 5%, or 10%.

In the example of FIG. 5, first parameter 622 is associated with (e.g., determined by, or affected by) a first RF environment between terminal 102 and RBS 140. Second parameter 626 is associated with (e.g., determined by, or affected by) a second RF environment between proxy terminal 142 and BS 104. Since terminal 102 and proxy terminal 142 have different locations, and BS 104 and RBS 140 have different locations, the first and second RF environments differ. Therefore, the first parameter 622 is very likely to be different from the second parameter 626.

In an LTE example, a timing-advance command is a six-bit value. The first parameter 622 can be the timing-advance command most recently received by terminal 102. The second parameter 626 can be the timing-advance command most recently transmitted by legitimate BS 104, e.g., as reported to verifier 144 and forwarded by verifier 144 to terminal 102 via secure network tunnel 618. If the two six-bit parameters 622, 626 are not equal, terminal 102 can conclude that it is not connected to BS 104.

At 630, the control unit can provide an indication 632 that an attack is under way against the network terminal 102. Operation 630 can be performed in response to the determination at operation 628. Indication 632 can include, e.g., a user-interface notification presented via UI 212 (e.g., a visible toast, a sound, a vibration, or another notification) or a network message, e.g., sent via secure network tunnel 618 or another communication channel. The attack can include, e.g., a MITM or DoS attack, or another attack in which RBS 140 induces terminal 102 to connect to RBS 140. In some example attacks, RBS 140 captures terminal 102 from a legitimate BS 104, e.g., by transmitting more reference-signal power than BS 104. In some example attacks, RBS 140 is the only BS within range of terminal 102.

In some examples, the secure storage unit 216 stores a key 634. In some of these examples, the challenge 606 is determined (operation 604) based at least in part on the key 634, the response 612 is validated (operation 614) based at least in part on the key 634, or both. In the figure, key 634 is shown as feeding both operations 604 and 614. This is merely for brevity of the figures. It is not necessary for the illustrated embodiments that the key 634 be used by both operations 604 and 614. In some illustrated embodiments, the key is used for operation 604 but not for operation 614. In other illustrated embodiments, the key is used for operation 614 but not for operation 604.

In some examples using TLS or similar protocols, the key 634 can be a public key associated with home network 134, verifier 144, or another network or network node to which the challenge 606 was transmitted. The challenge 606 can include first data encrypted using the key 634, e.g., a TLS PreMasterSecret. The response can include second data statistically unlikely to have been determined without knowledge of the first data encrypted in the challenge 606. For example, the second data can include a MAC determine using the first data or a key derived therefrom (e.g., a TLS master secret). Accordingly, in some examples, operations #1-#7 (FIG. 5) or operations 604-614 include performing at least a portion of a TLS handshake.

In some examples, the key 634 can be a shared secret associated with terminal 102, and intended to be known to home network 134 (e.g., to verifier 144) but not to RBS 140 or RSN 502. The challenge can include a TSV (e.g., a nonce, as discussed above). Response 612 can include response data that would be computed by a legitimate home network 134 using the shared secret and the TSV. Operation 614 can include performing, at terminal 102, the operations a legitimate home network 134 would perform, to determine verification data. For example, terminal 102 can determine the verification data including a hash-based MAC (HMAC) or other keyed MAC of the TSV based on key 634. Terminal 102 can then compare the determined verification data with the received response 612. If the verification data is equal to a MAC in response 612 (or other data in response 612 corresponding to the verification data), terminal 102 can determine that the response 612 is valid.

Figure 7:
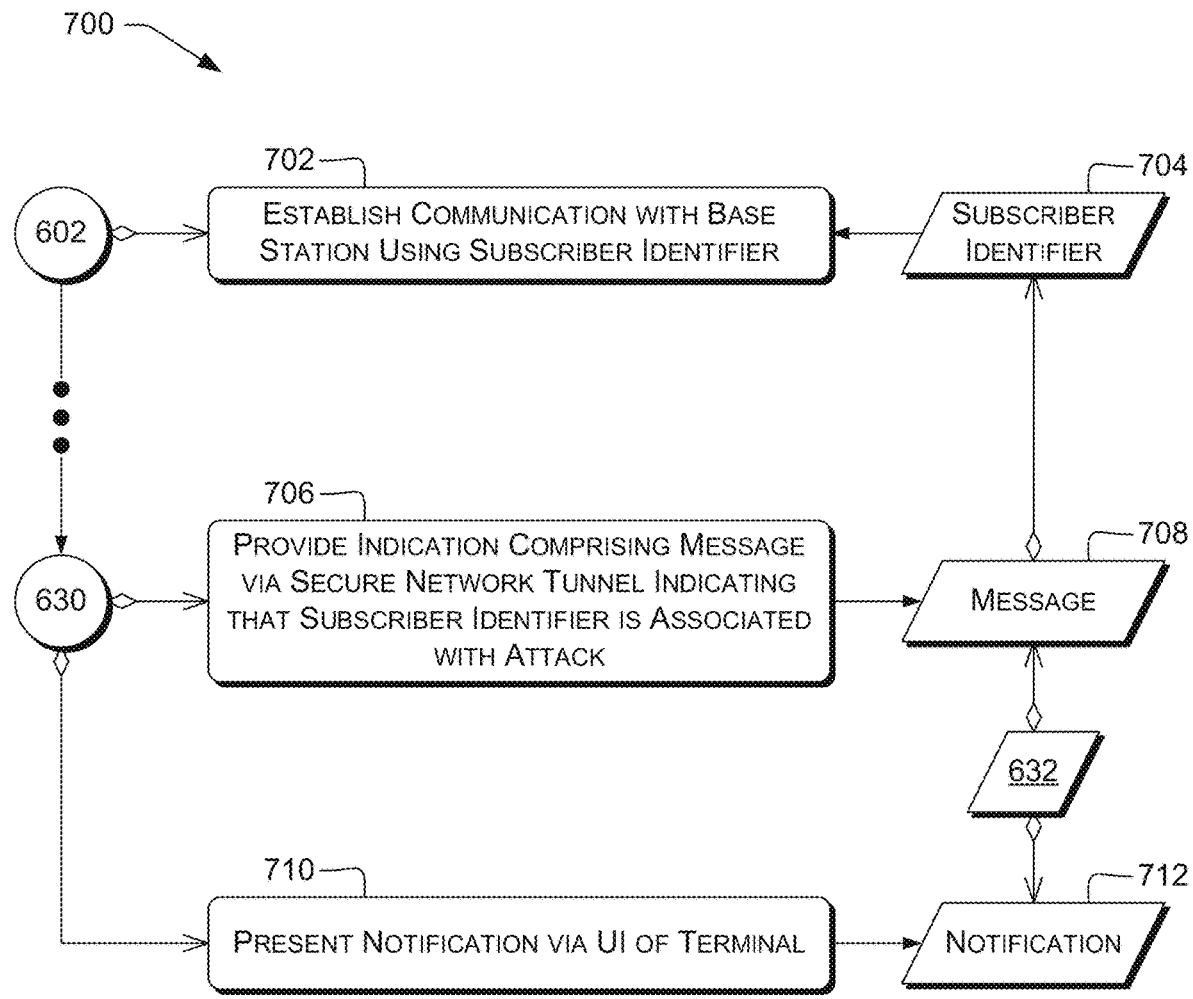
FIG. 7 is a dataflow diagram of example processes for detecting and responding to attacks against a network terminal.

FIG. 7 illustrates example processes 700 for detecting and responding to attacks against a network terminal, and related data items. The illustrated processes 700 can be carried out by a control unit, e.g., of a terminal 102. In some examples, operation 602 can include operation 702, or operation 630 can include operation 706 or 710. In some examples, process 700 includes operations 702 and 706. In some examples, process 700 includes operations 702 and 710.

At 702, the control unit can establish the communication with the base station using a SID 704, e.g., an IMSI or SUPI. In some examples, the SID is not a NATI (e.g., the SID is a USID). For example, operation 702 can be performed when a terminal is connecting for the first time to a particular network, and so does not have a NATI (as discussed herein with reference to operation 602). Additionally or alternatively, in some network technologies, RBS 140 may refuse to accept a NATI offered by terminal 102, and may instead require terminal 102 to provide an IMSI, SUPI, or other USID.

In some examples in which terminal 102 is communicating (e.g., unwittingly) with RBS 140, operations 602 or 702 may result in an adversary's learning a user's USID (e.g., IMSI or SUPI) before an attack can be detected (e.g., using operations 620-628). Therefore, the USID may be compromised. However, determination at operation 628 that the USD has been compromised can permit taking mitigation actions to reduce the adversary's scope of action with respect to the USID.

At 706, the control unit can provide the indication 632 at least partly by transmitting a message 708 transmitted via the secure network tunnel 618. Message 708 can include data indicating that the SID 704 is associated with the attack, e.g., revealed to an adversary system such as RBS 140.

At 710, the control unit can provide the indication 632 at least partly by presenting a notification 712 via UI 212 of terminal 102. For example, the notification 712 can include text suggesting that the user communicate with the operator of home network 134 regarding the security of the user's USID, or otherwise indicate that the subscriber identifier is associated with the attack.

Figure 8:
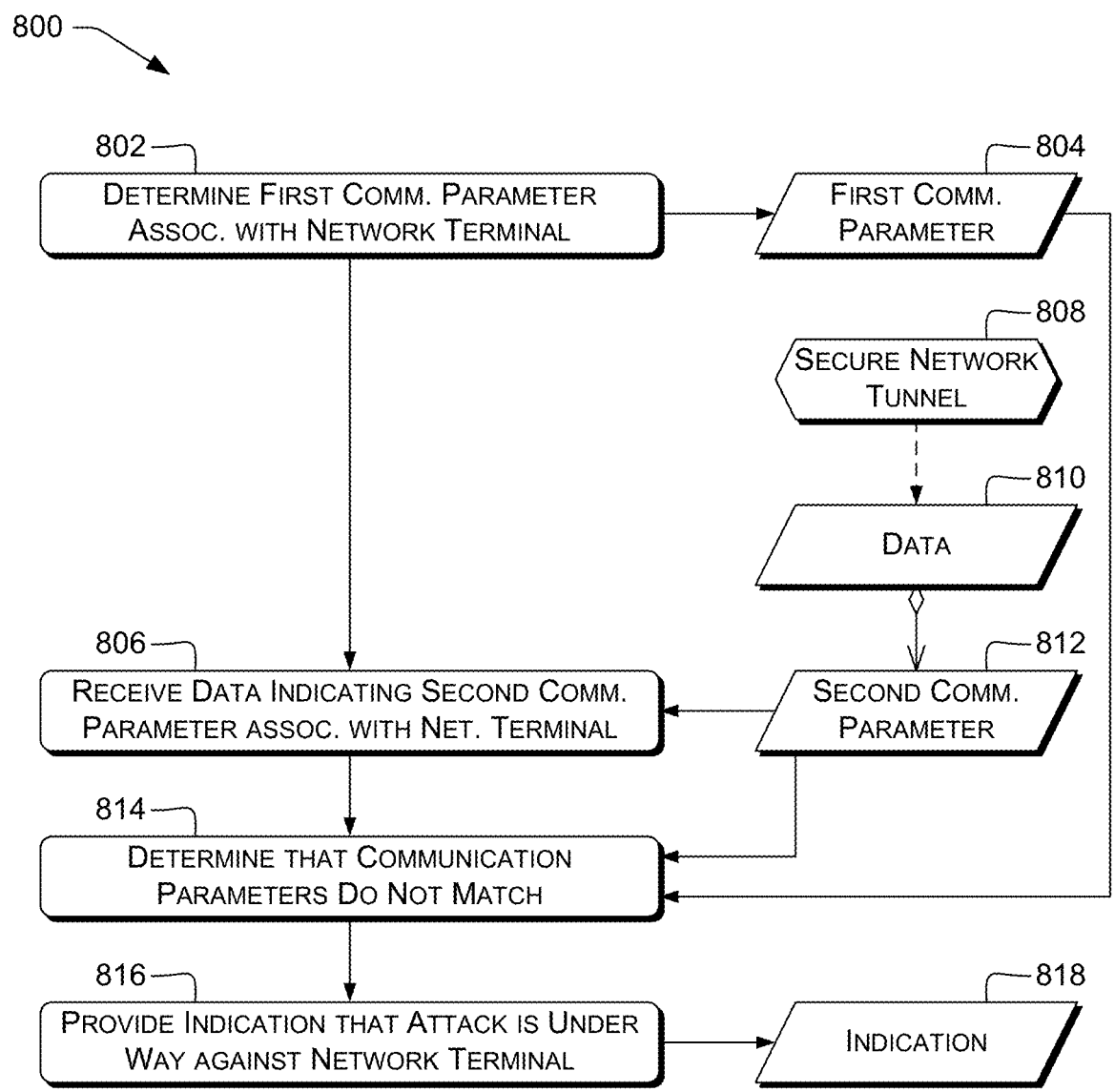
FIG. 8 is a dataflow diagram of an example process for detecting an attack against a network terminal.

FIG. 8 is a dataflow diagram illustrating an example process 800 for authorizing a network and detecting an attack, and related data items. Process 800 can be performed, e.g., by a network device such as terminal 102, 202 or a network node (e.g., verifier 144) of a home network 134 associated with the network terminal 102. The network device can include a control unit, e.g., having one or more processors (e.g., processor 208, 228) configured to perform operations described below, e.g., in response to computer program instructions of protocol module 220, detection module 222, or reporting module 234.

At 802, the control unit can determine a first communication parameter 804 associated with a network terminal 102 that is in wireless communication with (e.g., attached to, or in the process of attaching to) a network base station (e.g., RBS 140). Examples are discussed herein, e.g., with reference to operation 620 and parameter 622. For example, a terminal 102 can determine parameter 804 by querying its radio subsystem. Additionally or alternatively, a verifier 144 can query a BS 104 of home network 134, or a BS 104 of a visited network (e.g., a serving network 132 other than home network 134) provided that verifier 144 or home network 134 has a trust relationship in place with the BS 104 of the visited network.

At 806, the control unit can receive, e.g., via a secure network tunnel 808, data 810 indicating a second communication parameter 812 associated with the network terminal 102. Examples are discussed herein, e.g., with reference to operation 624, parameter 626, and secure network tunnel 618. For example, terminal 102 may receive parameter 812 from verifier 144, which may in turn have obtained parameter 812 from a legitimate BS 104 through which terminal 102 appears to be connecting (e.g., BS 104 in the example of FIG. 5). Operation 806 can include receiving parameter 812 from a proxy node, e.g., of home network 134, that is trusted by verifier 144 (or another network node performing process 800) and that terminates one end of secure network tunnel 808. Examples of proxy nodes can include IP routers, SMS routers, store-and-forward servers, GGSNs, PGWs, and UPFs.

In some nonlimiting examples, at least one of the first communication parameter 804 and the second communication parameter 812 can include at least one of: a round-trip time between the network terminal and the network base station; a timing advance value; an open-loop transmission power determined by the network terminal; a closed-loop transmission power control value determined by the network base station; a measured power at the network terminal of a reference signal transmitted by the base station; an intersymbol interference level at the network terminal; a most-recently-transmitted command from the network base station; an uplink or downlink allocation by the network base station to the network terminal; or a hash of data, the data including at least one of the preceding items in this paragraph. In some examples of a most-recently-transmitted command or an uplink or downlink allocation, these may differ between environment 504 and environment 506, at least because of the presence of terminal(s) 102 in environment 504 that are not in environment 506, or vice versa. Therefore, these values can be used to distinguish environment 504, detected by terminal 102, from environment 506, queried by verifier 144 from BS 104. In some examples, any difference between environments 504 and 506 indicates that a MITM attack is under way against terminal 102.

At 814, the control unit can determine that the first communication parameter 804 does not match the second communication parameter 812. Examples are discussed herein, e.g., with reference to operation 628. For example, the control unit can determine that the first communication parameter 804 is not identical to the second communication parameter 812, or that the first communication parameter 804 differs in value from the second communication parameter 812 by more than ±5%.

At 816, the control unit can provide an indication 818 that an attack (e.g., MITM) is under way against the network terminal 102. Operation 816 can be performed, e.g., in response to the determination at operation 814. Examples are discussed herein, e.g., with reference to operation 630 and indication 632. For example, terminal 102 can present a notification via UI 212, or the network device can send a network message.

Figure 9:
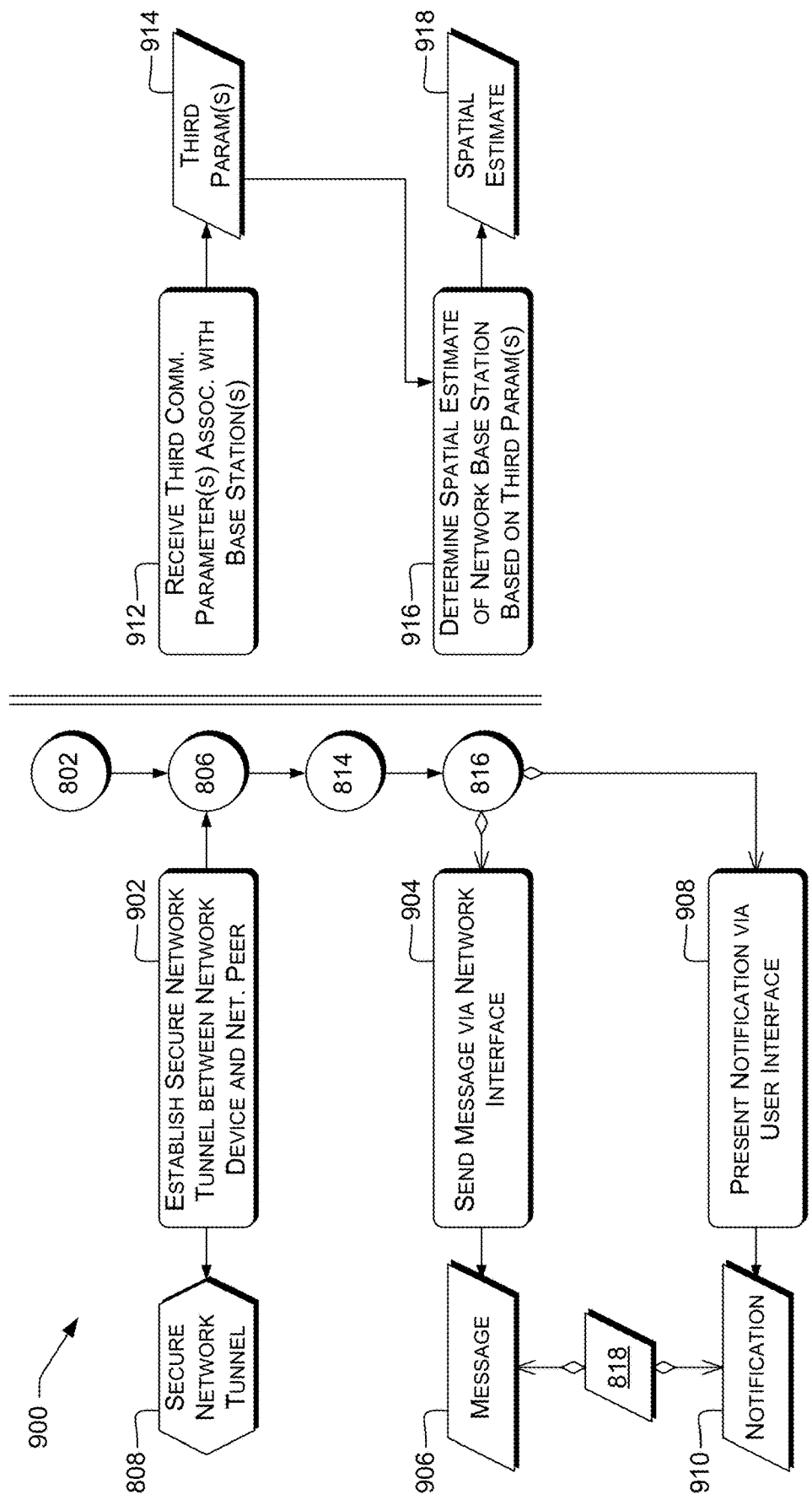
FIG. 9 is a dataflow diagram of example processes for establishing network tunnels and responding to attacks against a network terminal.

FIG. 9 illustrates example processes 900 for establishing network tunnels and responding to attacks against a network terminal, and related data items. The illustrated processes 900 can be carried out by a control unit, e.g., of a terminal 102 or a verifier 144. In some examples, operation 902 can be followed by operation 806, or operation 816 can include operation 904 or operation 908.

At 902, the control unit can establish the secure network tunnel 808 between the network device and a network peer. The network terminal 102 is either the network device or the network peer, in some of these examples. For example, operation 902 can include establishing the secure network tunnel via at least a mobile data connection of the network terminal 102; or a Short Message Service transport associated with the network terminal 102. Examples are discussed herein, e.g., with reference to FIG. 5 #8 and operation 616.

At 904, the control unit can provide the indication 818 at least partly by transmitting a message 906 via a network interface of the network device. For example, terminal 102 can transmit message 906 via secure network tunnel 808 (or another channel) to verifier 144, or vice versa. Examples are discussed herein, e.g., with reference to operation 706 and message 708.

At 908, the control unit can provide the indication 818 at least partly by presenting a user-interface notification 910 via a user interface, e.g., UI 212 or a UI of verifier 144. For example, the control unit can transmit a Web page, or transmit JSON or other push data (e.g., via AJAX or COMET) to a Web page, to cause presentation of notification 910 via a Web browser, e.g., in a network operations center of home network 134. Examples are discussed herein, e.g., with reference to operation 630.

Some examples include operations 912 and 916, which can permit determining a spatial estimate 918 of RBS 140. The spatial estimate 918 can be, e.g., an estimated position of RBS 140, or an estimated direction or distance from a reference point (e.g., terminal 102) to RBS 140. The spatial estimate 918 can be used, e.g., in determining locations of adversaries' facilities in order to terminate operation of those facilities. Operations 902-908 are mutually independent of operations 912 and 916.

At 912, the control unit can receive, via the secure network tunnel, one or more third communication parameters 914 associated with respective base stations (e.g., each parameter 914 is associated with one base station, and each base station may be associated with one or more parameters 914). The respective base stations can include the network base station, e.g., RBS 140. The third communication parameters 914 can include values of any of the types described herein, e.g., with reference to communication parameters 622, 626, 804, or 812. For example, the third communication parameters 914 can include respective propagation delays, round-trip times, or reference-signal power levels at terminal 102 from various BSes 104. The third communication parameters 914 can be transmitted in association with the ECIs, ECGIs, MCC/MNC pairs, latitude/longitude coordinates, or other IDs of the BSes. Those IDs can be used in determining locations of the BSes.

At 916, the control unit can determine, based at least in part on the one or more third communication parameters 914, a spatial estimate 918 of the network base station, e.g., RBS 140. For example, the control unit can use TDOA, FDOA, TFDOA, or other triangulation or multilateration techniques (e.g., spherical or hyperbolic location) to determine spatial estimate 918. Spatial estimate 918 can include an estimate of, e.g., location of RBS 140, direction from terminal 102 to RBS 140, or a region of space (e.g., a circle, ring, sphere, shell, torus, cone, or hyperboloid, or portion of any of those) in which RBS 140 is likely to be located.

In some examples, each of the third communication parameters 914 can be received at verifier 144 from a respective, different terminal 102, and each of the parameters 914 can be associated with RBS 140. The control unit can then determine a spatial estimate 918 of the location of RBS 140. In some examples in which parameters 914 include times, the control unit can perform TDOA or other techniques described in the previous paragraph.

In some examples, parameters 914 can include signal strengths received at the terminal. The control unit determine synthetic times from the respective signal strength values (parameters 914), then perform TDOA on the synthetic times. A synthetic time can be, e.g., the reciprocal of a parameter 914, a parameter 914 subtracted from the maximum of the parameters 914, the negative of a parameter 914, or another value that causes lower received signal strengths to map to longer synthetic times.

In some examples, each of the third communication parameters 914 can be received at verifier 144 from one of one or more terminals 102. For example, all of the parameters 914 can be received from a single terminal 102. In some examples, each of the third communication parameters 914 can be associated with a legitimate BS 104, or with another transmitter whose location is known. A function mapping received signal strength to distance from terminal 102 can be determined by regression (e.g., linear, quadratic, exponential, logarithmic, or other) of the parameters 914 against the corresponding transmitter locations, for those parameters 914 for which transmitter locations are known. That function can then be used to estimate a distance from terminal 102 to RBS 140 based on one or more received parameters 914 corresponding to RBS 140.

Figure 10:
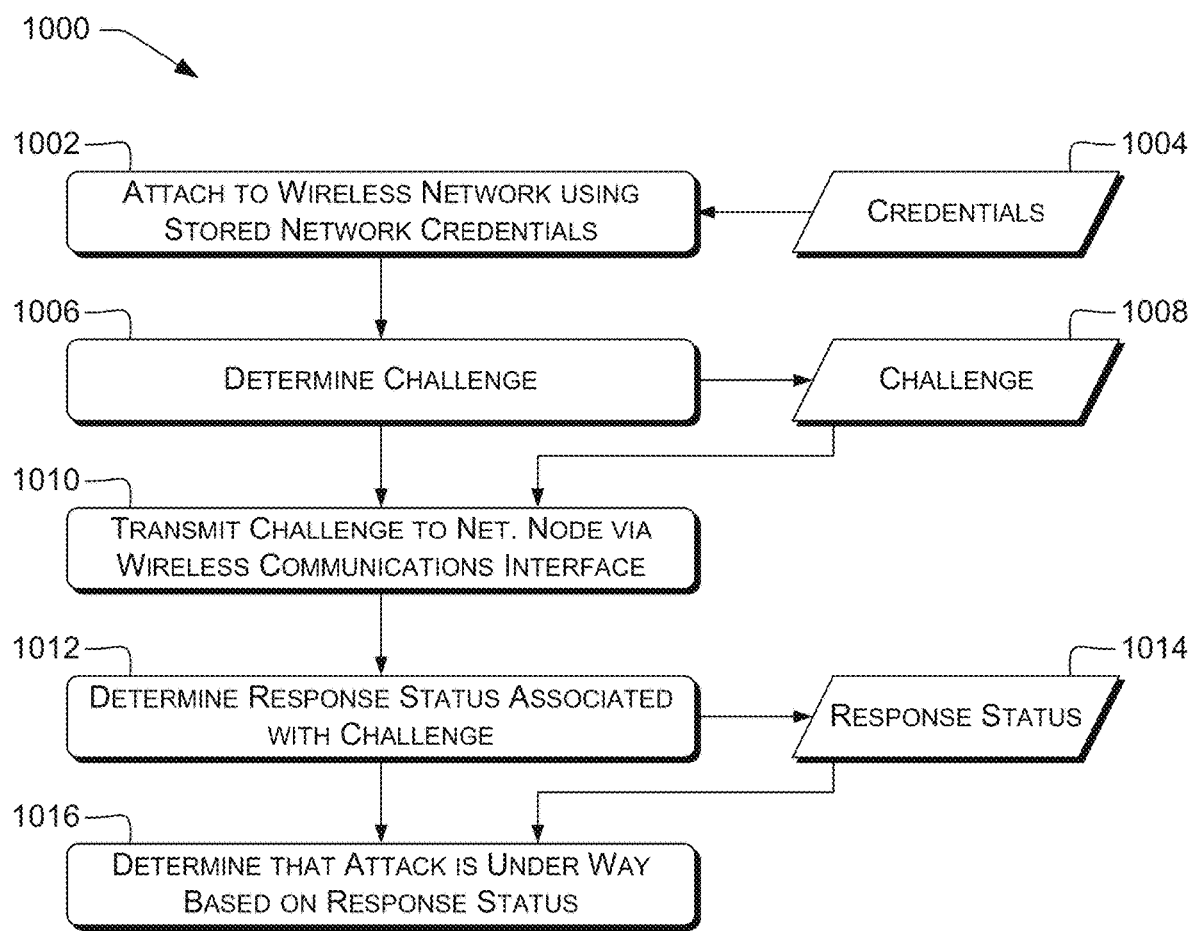
FIG. 10 is a dataflow diagram of an example process for validating a network node and detecting an attack (e.g., an attempt to impersonate a home network, or a denial-of-service attack) against a network terminal.

FIG. 10 is a dataflow diagram illustrating an example process 1000 for authorizing a network and detecting an attack, and related data items. Process 1000 can be performed, e.g., by a terminal 102, 202. Terminal 102 can include a control unit, e.g., having one or more processors (e.g., processor 208) configured to perform operations described below, e.g., in response to computer program instructions of security module 218.

At 1002, the control unit can attach to a wireless network using stored network credentials 1004. Credentials 1004 can include, e.g., an IMSI, or a shared secret key K, e.g., stored on a SIM or USIM. For example, the control unit can perform LTE or NR RRC and NAS attachment. Examples are discussed herein, e.g., with reference to operation 602.

At 1006, the control unit can determine a challenge 1008 (which can represent challenge 606). Examples are discussed herein, e.g., with reference to operation 604.

At 1010, the control unit can transmit the challenge 1008 to a network node (e.g., a verifier 144) via the wireless network. Examples are discussed herein, e.g., with reference to operation 608. Operation 1010 can be performed, e.g., after attaching to the wireless network (operation 1002). In some examples, operation 1002 includes a normal network-attachment process according to the network standard in use, and operation 1010 includes a subsequent operation not part of the network-attachment process.

At 1012, the control unit can determine a response status 1014 associated with the challenge 1008. Operation 1012 can be performed after operation 1010. Response status 1014 can include a response to the challenge 1008, e.g., received from the network node. Additionally or alternatively, response status 1014 can include an indication of an error encountered while attempting to send challenge 1008, or an error returned by the network node in response to the challenge 1008. Additionally or alternatively, response status 1014 can indicate that a timeout expired after challenge 1008 was sent, and that no response to challenge 1008 was received before the expiry of the timeout.

At 1016, the control unit can determine that an attack is under way based at least in part on the response status 1014. For example, the control unit can determine that an attack is under way based on at least one of: receiving an invalid response (see, e.g., operation 614 regarding validity determination); receiving an error from serving network 132 while attempting to transmit challenge 1008 (e.g., indicating that serving network 132 is an adversary system 138 or RSN 502 and is refusing to transmit unexpected data, e.g., while carrying out a DoS attack); receiving an error return from the network node (e.g., indicating that the network node is part of a rogue home network that is not configured to respond to challenge 1008); receiving an invalid response (e.g., indicating that the network node is part of a rogue home network that does not have the information required to correctly respond to challenge 1008; see, e.g., operation 614 regarding validity determination); or not receiving a response before the timeout expires (e.g., indicating that the network node is part of a rogue home network that is not configured to respond to challenge 1008).

Figure 11:
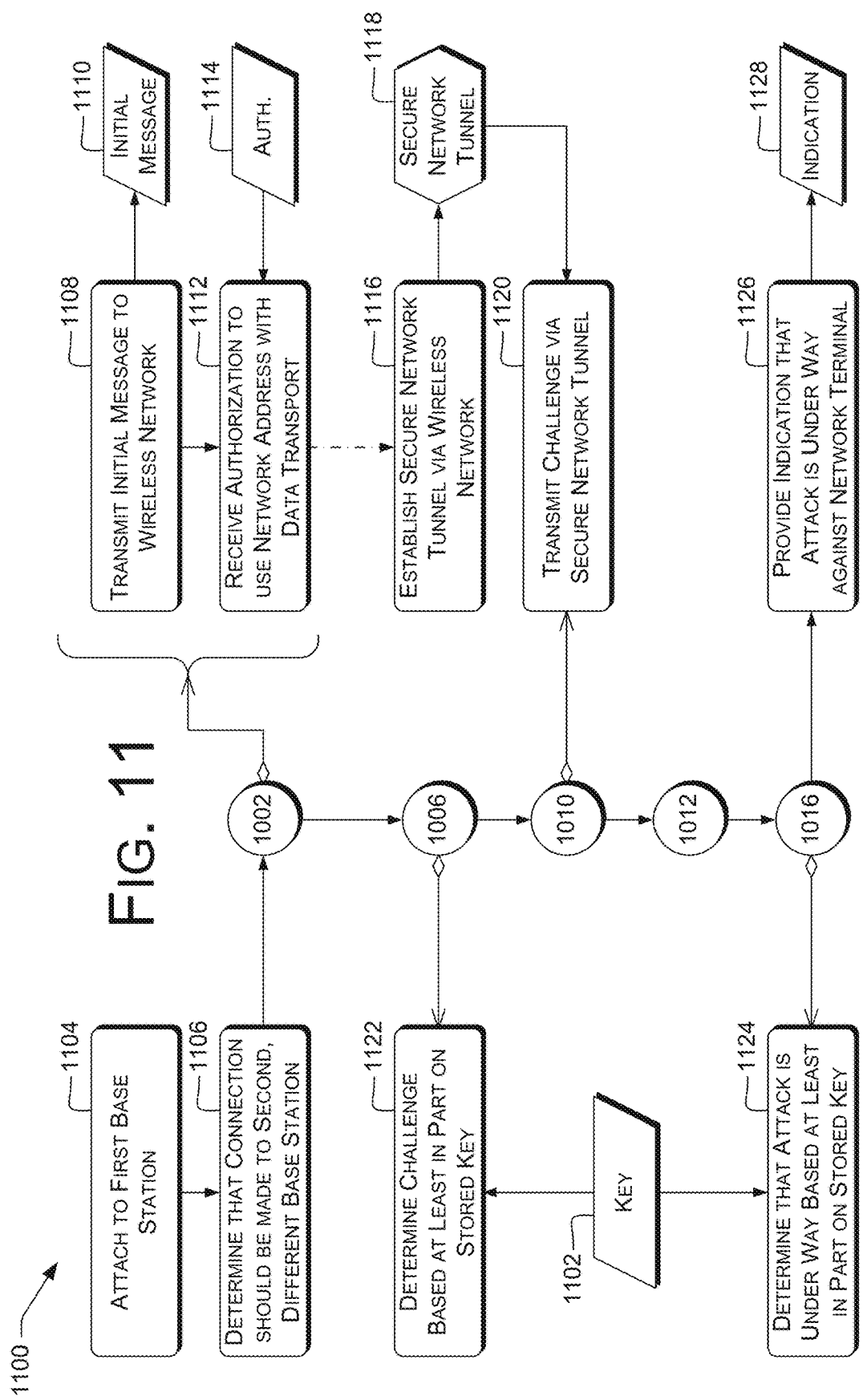
FIG. 11 is a dataflow diagram of example processes for attaching to and validating networks, and for detecting attacks against a network terminal.

FIG. 11 illustrates example processes 1100 for attaching to and validating networks, and for detecting attacks against a network terminal, and related data items. The illustrated processes 1100 can be carried out by a control unit, e.g., of a terminal 102. In some examples, operation 1106 can be followed by operation 1002; operation 1002 can include operations 1108 and 1112; operation 1006 can include operation 1122; operation 1010 can be preceded by operation 1116 or include operation 1120; operation 1016 can include operation 1124; or operation 1016 can include operation 1126. In some examples, terminal 102 stores a key 1102 (which can represent key 634).

Some examples are configured to detect attacks not only on initial attach, but also on handover, cell reselection, or other changes of BS. Some of these examples include operations 1104 and 1106 before operation 1002.

At 1104, the control unit can attach to a first base station, e.g., BS 104. Examples are discussed herein, e.g., with reference to operations 602, 702, and 1002.

At 1106, the control unit can determine that a connection should be made to a second, different base station. The second base stations may be, unbeknownst to terminal 102, RBS 140. For example, the control unit can determine that power levels, round-trip times, or other parameters indicate that RBS 140 should receive a handover of terminal 102 from the first base station. Operation 1106 can be performed as specified in the pertinent network standards, e.g., for handover or cell reselection. In response to the determination at operation 1106, the control unit can perform the attaching to the wireless network, operation 1002, via the second base station. This can permit performing operations 1006-1012 to determine whether an attack is under way via the second base station.

In some examples, the attachment process provides access to a data transport usable for sending the challenge 1008 and receiving response(s) thereto. Some of these examples use operations 1108 and 1112.

At 1108, the control unit can transmit an initial message 1110 to the wireless network. For example, the control unit can transmit a random-access preamble as initial message 1110. Operations and messages defined by the network technology in used can be performed before operations 1108 and 1112, and are omitted for brevity.

At 1112, the control unit can receive, via the wireless network, authorization 1114 to use a network address with a data transport. For example, authorization 1114 can include an RRCConnectionReconfiguration message permitting terminal 102 to send challenge 1008 via a packet data network (e.g., IMS—SMS over SIP, or other—or the public Internet) using a network-provided network address (e.g., IP address) (e.g., IPv4 or IPv6 data transport). Additionally or alternatively, authorization 1114 can include a NAS ATTACH ACCEPT message, after which terminal 102 is permitted to use NAS to send challenge 1008 encapsulated in SMS messages with the IMSI as the network address, as described herein (SMS data transport).

In some examples, a secure network tunnel is used to send the challenge 1008. This can reduce the probability of alteration of the challenge 1008 or response in transit. Some of these examples use operations 1006-1016 to detect rogue home networks, e.g., even if the rogue home has acquired a fraudulent TLS/SSL certificate and is therefore able to establish the tunnel. Some of these examples use operations 1122 and 1124.

At 1116, the control unit can establish a secure network tunnel 1118 (which can represent secure network tunnel 618, 808) with the network node via the wireless network. For example, the control unit can establish a TLS-secured connection. Examples are discussed herein, e.g., with reference to operations 616 and 902. Tunnel 1118 can be established over the data transport described herein with reference to operation 1112, as indicated by the dot-dashed arrow.

At 1120, the control unit can transmit the challenge 1008 via the secure network tunnel. For example, the control unit can transmit the challenge 1008 as data via a tunnel 1118 over any of the transports described herein, e.g., mobile data or SMS. Examples are discussed herein, e.g., with reference to FIG. 5 #2 or operations 608 or 1010.

Some examples use key 1102 in validating home network 134 or serving network 132. Various of these examples use exactly one of, at least one of, or both of, operations 1122 and 1124.

At 1122, the control unit can determine the challenge based at least in part on the stored key 1102. Examples are discussed herein, e.g., with reference to operation 604 and key 634.

At 1124, the control unit can determine that the attack is under way based at least in part on the stored key 1102. Examples are discussed herein, e.g., with reference to operation 610 and key 634. For example, if key 1102 is used in an HMAC-based challenge/response protocol, the control unit can determine that the attack is under way if a MAC included in a response indicated by response status 1014 does not match a MAC computed at terminal 102.

At 1126, the control unit can provide an indication 1128 that the attack is under way in response to the determining at operation 1016 that the attack is under way. Examples are discussed herein, e.g., with reference to operations 630, 706, 710, 816, 904, and 908.

Figure 12:
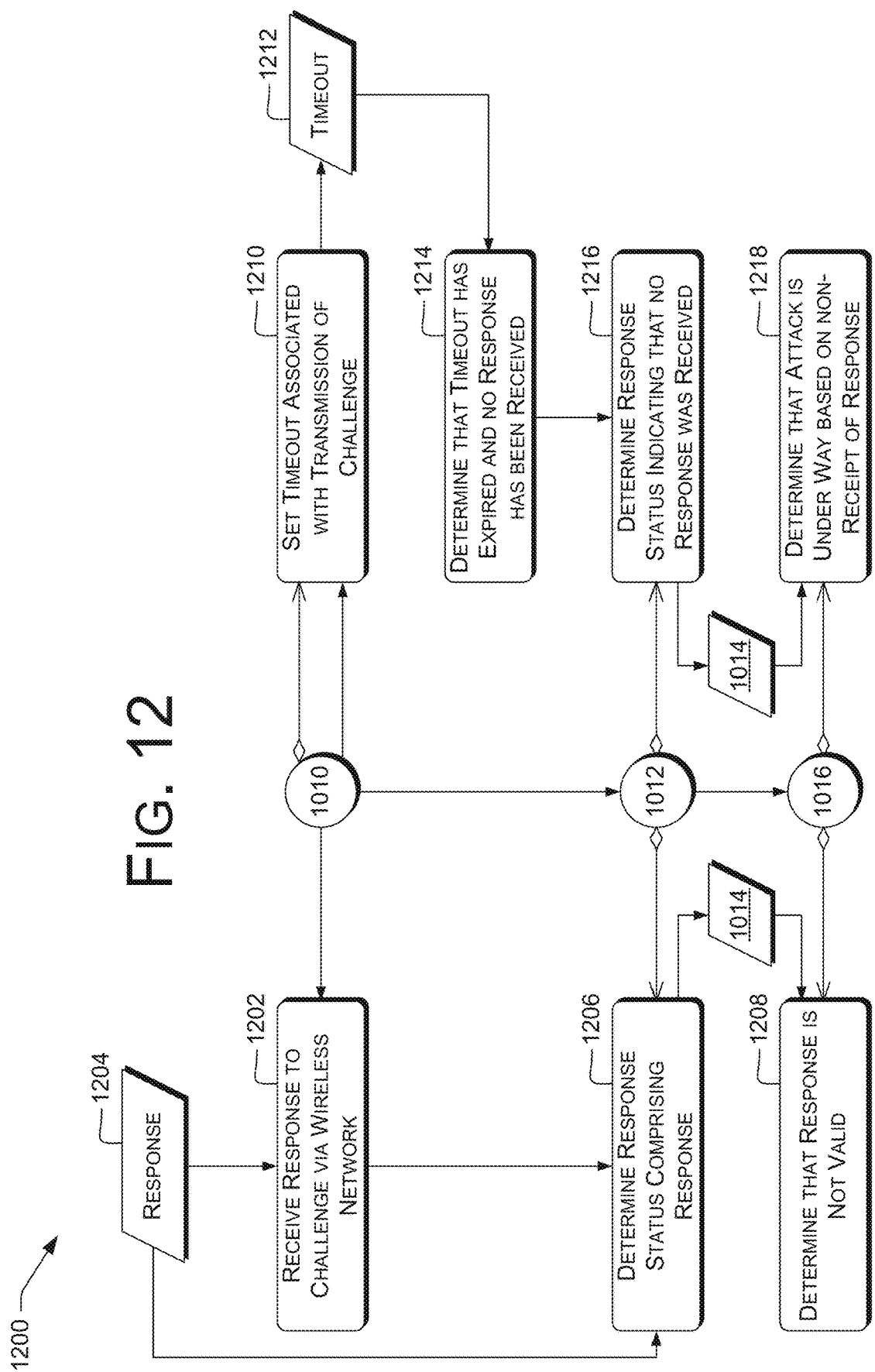
FIG. 12 is a dataflow diagram of example processes for detecting attacks against a network terminal.

FIG. 12 illustrates example processes 1200 for detecting attacks against a network terminal, and related data items. The illustrated processes 1200 can be carried out by a control unit, e.g., of a terminal 102. In some examples, operation 1010 can include operation 1210; operation 1010 can be followed by operation 1202 or operation 1210; operation 1012 can include operation 1206 or 1216; or operation 1016 can include operation 1208 or 1218.

In some examples, operation 1016 for determining that the attack is under way further comprises operation 1208, which is performed after operations 1202 and 1206.

At 1202, the control unit can receive a response 1204 (which can represent response 612) to the challenge 1008 via the wireless network. Examples are discussed herein, e.g., with reference to operation 610.

At 1206, the control unit can determine the response status 1014 comprising the response 1204. For example, the control unit can incorporate data of response 1204, or at least a portion thereof, into response status 1014.

At 1208, the control unit can determine that the response 1204 is not valid. Examples of validity tests are described herein with reference to operations 614 and 1124. Operation 1208 can include applying a validity test and determining that response 1204 fails that validity test.

In some examples, operation 1016 for determining that the attack is under way further comprises operation 1218, which is performed after operations 1210, 1214, and 1216.

At 1210, the control unit can set a timeout 1212 associated with the transmitting of the challenge 1008 (operation 1010). For example, timeout 1212 can include a predetermined time period (e.g., 100 ms or 1 s) after challenge 1008 is transmitted, or the end time of such a period.

At 1214, the control unit can determine, subsequently, that the timeout 1212 has expired and that no response has been received. For example, the control unit can determine that the predetermined time period has elapsed since transmission of challenge 1008, or that a clock of terminal 102 indicates a time at or after the end time of the period. The control unit can additional determine, e.g., by querying communications interface 214, that the response has not been received.

At 1216, the control unit can determine, in response to the determination at operation 1214, the response status 1014 indicating that no response was received.

At 1218, the control unit can determine that the attack is under way based at least in part on the response status 1014 indicating that no response was received. For example, if the home network 134 is not configured to provide a response 1204, or the serving network 132 is not configured to forward the response 1204, the control unit can determine that at least one network 132, 134 is under control of an adversary.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A network terminal, comprising: a wireless communications interface; a secure storage unit having stored therein a key; and a control unit configured to perform operations comprising: establishing communication with a base station via the wireless communications interface; determining a challenge; transmitting the challenge via the wireless communications interface; receiving a response via the wireless communications interface; determining that the response is valid; establishing a secure network tunnel via the wireless communications interface to a network node at least partly in response to the determining that the response is valid; determining a first communication parameter associated with the communication with the base station; receiving data indicating a second communication parameter via the secure network tunnel; determining that the first communication parameter does not match the second communication parameter; and in response, providing an indication that an attack is under way against the network terminal; wherein at least: the challenge is determined based at least in part on the key; the response is validated based at least in part on the key.

B: The network terminal according to paragraph A, the operations comprising establishing the secure network tunnel based at least in part on: the key, or a certificate stored in the secure storage unit and associated with the network node.

C: The network terminal according to paragraph A or B, further comprising a user interface, wherein the indication comprises a user-interface notification presented via the user interface.

D: The network terminal according to any of paragraphs A-C, the operations comprising establishing the communication with the base station using a network-assigned temporary identity.

E: The network terminal according to any of paragraphs A-D, the operations comprising: establishing the communication with the base station using a subscriber identifier; and providing the indication at least partly by transmitting a message via the secure network tunnel indicating that the subscriber identifier is associated with the attack.

F: The network terminal according to paragraph E, wherein the subscriber identifier is not a network-assigned temporary identity (NATI).

G: The network terminal according to any of paragraphs A-F, the operations comprising establishing the secure network tunnel via at least: a mobile data connection; or a Short Message Service transport.

H: The network terminal according to any of paragraphs A-G, further comprising a user interface, the operations further comprising: establishing the communication with the base station using a subscriber identifier; and providing the indication at least partly by presenting a user-interface notification indicating that the subscriber identifier is associated with the attack.

I: The network terminal according to paragraph H, wherein the subscriber identifier is not a network-assigned temporary identity (NATI).

J: A method comprising, by a network device: determining a first communication parameter associated with a network terminal that is in wireless communication with a network base station; receiving data indicating a second communication parameter associated with the network terminal via a secure network tunnel; determining that the first communication parameter does not match the second communication parameter; and in response, providing an indication that an attack is under way against the network terminal.

K: The method according to paragraph J, wherein the network device is at least one of: the network terminal, or a network node of a home network associated with the network terminal.

L: The method according to paragraph J or K, further comprising: receiving, via the secure network tunnel, one or more third communication parameters associated with respective base stations; and determining, based at least in part on the one or more third communication parameters, a spatial estimate of the network base station.

M: The method according to paragraph L, wherein the network device is not the network terminal.

N: The method according to any of paragraphs J-M, further comprising providing the indication at least partly by: presenting a user-interface notification via a user interface; or transmitting a message via a network interface of the network device.

O: The method according to any of paragraphs J-N, further comprising establishing the secure network tunnel between the network device and a network peer, wherein the network terminal is either the network device or the network peer.

P: The method according to paragraph O, further comprising establishing the secure network tunnel via at least: a mobile data connection of the network terminal; or a Short Message Service transport associated with the network terminal.

Q: The method according to any of paragraphs J-P, further comprising determining that the first communication parameter is not identical to the second communication parameter.

R: The method according to any of paragraphs J-Q, wherein at least one of the first communication parameter and the second communication parameter includes at least one of: a round-trip time between the network terminal and the network base station; a timing advance value; an open-loop transmission power determined by the network terminal; a closed-loop transmission power control value determined by the network base station; a measured power at the network terminal of a reference signal transmitted by the base station; an intersymbol interference level at the network terminal; a most-recently-transmitted command from the network base station; an uplink or downlink allocation by the network base station to the network terminal; or a hash of data, the data including at least one of the preceding.

S: At least one tangible, non-transitory computer-readable medium comprising instructions that, when executed by one or more processors, cause the one or more processors to perform operations; wherein: the operations comprise: attaching to a wireless network using stored network credentials; determining a challenge; after attaching to the wireless network, transmitting the challenge to a network node via the wireless network; subsequently, determining a response status associated with the challenge; and determining that an attack is under way based at least in part on the response status; and the operations further comprise at least: determining the challenge based at least in part on a stored key; or determining that the attack is under way based at least in part on the stored key.

T: The at least one tangible, non-transitory computer-readable medium according to paragraph S, the operations further comprising providing an indication that the attack is under way in response to the determining that the attack is under way.

U: The at least one tangible, non-transitory computer-readable medium according to paragraph S or T, wherein: the operations further comprise: receiving a response to the challenge via the wireless network; and determining the response status comprising the response; and the operations for determining that the attack is under way further comprise operations for determining that the response is not valid.

V: The at least one tangible, non-transitory computer-readable medium according to any of paragraphs S-U, the operations further comprising: setting a timeout associated with the transmitting of the challenge; subsequently, determining that the timeout has expired and that no response has been received; in response, determining the response status indicating that no response was received; and determining that the attack is under way based at least in part on the response status indicating that no response was received.

W: The at least one tangible, non-transitory computer-readable medium according to any of paragraphs S-V, the operations further comprising: establishing a secure network tunnel with the network node via the wireless network; and transmitting the challenge via the secure network tunnel.

X: The at least one tangible, non-transitory computer-readable medium according to any of paragraphs S-W, the operations further comprising: attaching to a first base station; determining that a connection should be made to a second, different base station; and in response, performing the attaching to the wireless network via the second base station.

Y: The at least one tangible, non-transitory computer-readable medium according to any of paragraphs S-X, wherein the operations for attaching to the wireless network comprise operations for: transmitting an initial message to the wireless network; and receiving, via the wireless network, authorization to use a network address with a data transport.

Z: Any of A-Y, excluding performing a TLS handshake.

AA: A computer-readable medium, e.g., a computer storage medium, having thereon computer-executable instructions, the computer-executable instructions upon execution configuring a computer to perform operations as any of paragraphs A-I, J-R, S-Y, or Z recites.

AB: A device comprising: a processor; and a computer-readable medium, e.g., a computer storage medium, having thereon computer-executable instructions, the computer-executable instructions upon execution by the processor configuring the device to perform operations as any of paragraphs A-I, J-R, S-Y, or Z recites.

AC: A system comprising: means for processing; and means for storing having thereon computer-executable instructions, the computer-executable instructions including means to configure the system to carry out a method as any of paragraphs A-I, J-R, S-Y, or Z recites.

AD: A method comprising performing operations as any of paragraphs A-I, J-R, S-Y, or Z recites.

CONCLUSION

This disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. Rather, the specific features and steps are disclosed as preferred forms of implementing the claimed invention. For example, network nodes shown in FIG. 1, processors 208, 228 and other components of system 200, network 206, and other structures described herein for which multiple types of implementing devices or structures are listed can include any of the listed types, and/or multiples and/or combinations thereof.

Similarly, the operations of example processes herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and processes described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more systems 200, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

The invention claimed is:

1. A method comprising, by a network device:
   establishing communication with a network base station via a wireless communications interface;
   at least partly in response to the establishing communication with the network base station, establishing a secure network tunnel via the wireless communications interface;
   at least partly in response to the establishing communication with the network base station, determining a first communication parameter associated with a network terminal that is in wireless communication with the network base station;
   at least partly in response to the establishing communication with the network base station, receiving, via the secure network tunnel, data indicating a second communication parameter associated with the network terminal;
   at least partly in response to the establishing communication with the network base station, determining that the first communication parameter does not match the second communication parameter; and
   at least partly in response to the establishing communication with the network base station and to the determining that the first communication parameter does not match the second communication parameter, providing an indication that an attack is under way against the network terminal.

2. The method according to claim 1, further comprising:
   receiving, via the secure network tunnel, one or more third communication parameters associated with respective base stations; and
   determining, based at least in part on the one or more third communication parameters, a spatial estimate of the network base station.

3. The method according to claim 1, further comprising providing the indication at least partly by:
   presenting a user-interface notification via a user interface; or
   transmitting a message via a network interface of the network device.

4. The method according to claim 1, further comprising establishing the secure network tunnel between the network device and a network peer, wherein the network terminal is either the network device or the network peer.

5. The method according to claim 4, further comprising establishing the secure network tunnel via at least:
   a mobile data connection of the network terminal; or
   a Short Message Service transport associated with the network terminal.

6. The method according to claim 1, further comprising determining that the first communication parameter is not identical to the second communication parameter.

7. The method according to claim 1, wherein at least one of the first communication parameter and the second communication parameter includes at least one of:
   a round-trip time between the network terminal and the network base station;
   a timing advance value;
   an open-loop transmission power determined by the network terminal;
   a closed-loop transmission power control value determined by the network base station;
   a measured power at the network terminal of a reference signal transmitted by the base station;
   an intersymbol interference level at the network terminal;
   a most-recently-transmitted command from the network base station;
   an uplink or downlink allocation by the network base station to the network terminal; or
   a hash of data, the data including at least one of the preceding.

8. A network device, comprising:
   a wireless communications interface;
   a secure storage unit having stored therein a key; and
   a control unit configured to perform operations comprising:
      establishing communication with a network base station via the wireless communications interface;
      at least partly in response to the establishing communication with the network base station, establishing a secure network tunnel via the wireless communications interface;
      at least partly in response to the establishing communication with the network base station, determining a first communication parameter associated with a network terminal that is in wireless communication with the network base station;
      at least partly in response to the establishing communication with the network base station, receiving, via the secure network tunnel, data indicating a second communication parameter associated with the network terminal;
      at least partly in response to the establishing communication with the network base station, determining that the first communication parameter does not match the second communication parameter; and
      at least partly in response to the establishing communication with the network base station and to the determining that the first communication parameter does not match the second communication parameter, providing an indication that an attack is under way against the network terminal.

9. The network device according to claim 8, the operations further comprising:
receiving, via the secure network tunnel, one or more third communication parameters associated with respective base stations; and
determining, based at least in part on the one or more third communication parameters, a spatial estimate of the network base station.

10. The network device according to claim 8, the operations further comprising providing the indication at least partly by:
presenting a user-interface notification via a user interface; or
transmitting a message via a network interface of the network device.

11. The network device according to claim 8, the operations further comprising establishing the secure network tunnel between the network device and a network peer, wherein the network terminal is either the network device or the network peer.

12. The network device according to claim 11, the operations further comprising establishing the secure network tunnel via at least:
a mobile data connection of the network terminal; or
a Short Message Service transport associated with the network terminal.

13. The method according to claim 8, the operations further comprising determining that the first communication parameter is not identical to the second communication parameter.

14. The network device according to claim 8, wherein at least one of the first communication parameter and the second communication parameter includes at least one of:
a round-trip time between the network terminal and the network base station;
a timing advance value;
an open-loop transmission power determined by the network terminal;
a closed-loop transmission power control value determined by the network base station;
a measured power at the network terminal of a reference signal transmitted by the base station;
an intersymbol interference level at the network terminal;
a most-recently-transmitted command from the network base station;
an uplink or downlink allocation by the network base station to the network terminal; or
a hash of data, the data including at least one of the preceding.

15. At least one tangible, non-transitory computer-readable medium comprising instructions that, when executed by one or more processors, cause the one or more processors to perform operations comprising, by a network device:
establishing communication with a network base station via a wireless communications interface;
at least partly in response to the establishing communication with the network base station, establishing a secure network tunnel via the wireless communications interface;
at least partly in response to the establishing communication with the network base station, determining a first communication parameter associated with a network terminal that is in wireless communication with the network base station;
at least partly in response to the establishing communication with the network base station, receiving, via the secure network tunnel, data indicating a second communication parameter associated with the network terminal;
at least partly in response to the establishing communication with the network base station, determining that the first communication parameter does not match the second communication parameter; and
at least partly in response to the establishing communication with the network base station and to the determining that the first communication parameter does not match the second communication parameter, providing an indication that an attack is under way against the network terminal.

16. The at least one tangible, non-transitory computer-readable medium according to claim 15, the operations further comprising:
receiving, via the secure network tunnel, one or more third communication parameters associated with respective base stations; and
determining, based at least in part on the one or more third communication parameters, a spatial estimate of the network base station.

17. The at least one tangible, non-transitory computer-readable medium according to claim 15, the operations further comprising providing the indication at least partly by:
presenting a user-interface notification via a user interface; or
transmitting a message via a network interface of the network device.

18. The at least one tangible, non-transitory computer-readable medium according to claim 15, the operations further comprising establishing the secure network tunnel between the network device and a network peer, wherein the network terminal is either the network device or the network peer.

19. The at least one tangible, non-transitory computer-readable medium according to claim 18, the operations further comprising establishing the secure network tunnel via at least:
a mobile data connection of the network terminal; or
a Short Message Service transport associated with the network terminal.

20. The at least one tangible, non-transitory computer-readable medium according to 15, the operations further comprising determining that the first communication parameter is not identical to the second communication parameter.

* * * * *